US009900354B1

(12) United States Patent
Thome et al.

(10) Patent No.: US 9,900,354 B1
(45) Date of Patent: Feb. 20, 2018

(54) VIRTUAL CARPOOLING

(71) Applicant: Allstate Insurance Company, Northbrook, IL (US)

(72) Inventors: Lindsey Jo Thome, Chicago, IL (US); Tara Cavallaro Kozlowski, Geneva, IL (US)

(73) Assignee: Allstate Insurance Company, Northbrook, IL (US)

( * ) Notice: Subject to any disclaimer, the term of this patent is extended or adjusted under 35 U.S.C. 154(b) by 436 days.

(21) Appl. No.: 14/619,376

(22) Filed: Feb. 11, 2015

(51) Int. Cl.
*G06F 17/30* (2006.01)
*H04L 29/06* (2006.01)
*H04L 29/08* (2006.01)
*H04L 12/58* (2006.01)
*G06F 3/16* (2006.01)
(Continued)

(52) U.S. Cl.
CPC ............ *H04L 65/403* (2013.01); *G06F 3/167* (2013.01); *G06F 17/30598* (2013.01); *G06F 17/30752* (2013.01); *H04L 51/32* (2013.01); *H04L 67/125* (2013.01); *H04L 67/22* (2013.01); *G01C 21/3697* (2013.01); *G06F 17/30017* (2013.01); *G06F 17/3074* (2013.01); *G06F 17/30557* (2013.01); *G06F 17/30864* (2013.01);
(Continued)

(58) Field of Classification Search
CPC ......... H04W 4/04; H04W 4/206; H04W 4/16; H04L 12/1822; H04L 65/403; G06F 17/28; G06F 17/30241; G06F 17/30557; G06F 17/30864; G06Q 50/30

USPC ....... 707/740, 736, 758, 608, 732, 780, 916; 455/416, 414.1; 370/260
See application file for complete search history.

(56) References Cited

U.S. PATENT DOCUMENTS 6,781,963 B2   8/2004   Crockett et al.
6,868,333 B2 *  3/2005   Melen .................... G01C 21/26
                                                            701/482
(Continued)

FOREIGN PATENT DOCUMENTS

CN    103428006 A   12/2013
JP    2007148524 A   6/2007
(Continued)

OTHER PUBLICATIONS

Chevrolet Spark Virtual Carpool Contest Promo Mechanics, pp. 1-3.
(Continued)

*Primary Examiner* — Dangelino Gortayo
(74) *Attorney, Agent, or Firm* — Banner & Witcoff, Ltd.

(57) ABSTRACT

A system comprising a first computing device operated by a first driver, a second computing device operated by a second driver, and a server is disclosed. The server may determine one or more characteristics of the first driver based on at least one of listening preferences or telematics data of the first driver. Based on the one or more characteristics of the first driver, the server may assign the first driver to a conference. The server may receive a request from the second computing device for the second driver to participate in conferencing. The server may determine that the second driver has at least one characteristic that matches one of the one or more characteristics of the first driver and may assign the second driver to the conference with the first driver. The server may bridge the first driver and the second driver in the conference.

20 Claims, 10 Drawing Sheets

(51) Int. Cl.
*G06Q 50/00* (2012.01)
*H04L 12/18* (2006.01)
*G01C 21/36* (2006.01)

(52) U.S. Cl.
CPC .......... *G06Q 50/01* (2013.01); *H04L 12/1822* (2013.01); *H04L 65/1066* (2013.01); *H04L 67/12* (2013.01)

(56) References Cited

U.S. PATENT DOCUMENTS

| | | | |
|---|---|---|---|
| 6,898,436 B2 | 5/2005 | Crockett et al. | |
| 7,130,282 B2 | 10/2006 | Black | |
| 7,155,203 B2 | 12/2006 | Brewer et al. | |
| 7,526,074 B2 | 4/2009 | Craig | |
| 7,672,270 B2 | 3/2010 | Roggero et al. | |
| 7,711,119 B2 | 5/2010 | Brett et al. | |
| 8,560,013 B2 * | 10/2013 | Jotanovic | H04W 4/003 455/414.2 |
| 8,577,405 B2 | 11/2013 | Davis et al. | |
| 9,014,661 B2 * | 4/2015 | deCharms | H04W 4/021 348/14.02 |
| 9,042,873 B2 * | 5/2015 | Basir | G10L 15/265 455/416 |
| 9,232,069 B2 * | 1/2016 | Barrett | H04M 3/56 |
| 9,296,396 B2 * | 3/2016 | Gluck | B60W 40/08 |
| 9,319,357 B2 * | 4/2016 | Moyers | H04L 51/04 |
| 2002/0061761 A1 | 5/2002 | Maggenti et al. | |
| 2002/0161841 A1 | 10/2002 | Kinnunen | |
| 2003/0153343 A1 | 8/2003 | Crockett et al. | |
| 2004/0058698 A1 | 3/2004 | Crockett et al. | |
| 2005/0041625 A1 | 2/2005 | Brewer | |
| 2005/0153724 A1 | 7/2005 | Vij et al. | |
| 2011/0121991 A1 * | 5/2011 | Basir | G08G 1/0962 340/902 |
| 2011/0196571 A1 | 8/2011 | Foladare et al. | |
| 2011/0300840 A1 | 12/2011 | Basir | |
| 2012/0271640 A1 | 10/2012 | Basir | |
| 2013/0086164 A1 | 4/2013 | Wheeler et al. | |
| 2014/0095305 A1 | 4/2014 | Armitage et al. | |
| 2014/0214933 A1 * | 7/2014 | Liu | H04L 67/02 709/204 |
| 2014/0357226 A1 * | 12/2014 | Charugundla | H04W 4/023 455/411 |
| 2015/0160019 A1 * | 6/2015 | Biswal | G01C 21/26 701/1 |

FOREIGN PATENT DOCUMENTS

| | | |
|---|---|---|
| JP | 2011250021 A | 12/2011 |
| WO | 2014082273 A1 | 6/2014 |
| WO | 2014098846 A1 | 6/2014 |

OTHER PUBLICATIONS

Ghafoor and Baker, "Inter-Vehicle Communication Protocols for Multimedia Transmission," Proceedings of the International MultiConference of Engineers and Computer Scientists 2010, vol. II, IMECS 2010, Mar. 17-19, 2010, Hong Kong, pp. 1-5.

Gruebele, Interactive System for Real Time Dynamic Multi-hop Carpooling, Sep. 2, 2008, pp. 1-17.

Guill, Aidan Mac, "French Website Makes Euro-Carpooling a Snap," Wired, Dec. 10, 2010, printed Jan. 22, 2015, pp. 1-3 (http://www.wired.com/2010/10/covoiturage-carpooling-website/).

Qualcomm Press Release, "Leading Refrigerated Fleet Stevens Transport Rolls Out Qualcomm Platform and Applications Fleet-Wide," Jan. 25, 2012, pp. 1-6, https://www.qualcomm.com/news/releases/2012/01/25/leading-refrigerated-fleet-stevens-transport-rolls-out-qualcomm-platform.

UULM, Research, Inter-Vehicle Communication / Vehicular Ad Hoc Networks, pp. 1-3, http://www.uni-ulm.de/en/in/institute-of-information-resource-management/research/former-areas-of-research/inter-vehicle-communication.html.

\* cited by examiner

VIRTUAL CARPOOLING

BACKGROUND

A driver may experience long drives or long commutes from home to work and vice versa. For example, a driver may live in a suburb outside of a metropolitan area and may work in downtown or in the city. The driver may commute an hour and a half or longer to get to work every morning, as well as an hour and a half or longer to get back home every evening. A commute may also be exacerbated by varying road conditions, such as rush hour traffic or weather-related issues. For instance, a driver may have a longer commute if he or she leaves for work during rush hour when hundreds or thousands of other drivers are also leaving for work at the same time. With a large volume of drivers on the road, a driver's commute may be even longer than a typical commute time due to greater chances of traffic, road blocks, or road closures due to potential car accidents.

In another example, a driver may also experience long drives when taking several long distance trips as part of his or her job or for personal interests. For example, a driver may travel regularly or periodically for his job and may drive cross-country multiple times a month or year. Such long commutes may become particularly tedious, especially for a driver who travels alone. It may be beneficial for such a driver to be able to communicate with other drivers in order to pass the time during such trips or during commutes to work.

Although drivers may wish to talk on a phone to pass the time, making a phone call while driving may be dangerous. For example, a driver may be involved in an accident as a result of being distracted when entering a phone number to make an outgoing call or making a selection to receive an incoming call. As such, new systems, methods, and devices may be desired to assist in establishing communications for drivers while driving.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing a virtual carpool system to assign drivers to virtual carpools based on characteristics of the drivers. The disclosure describes a system comprising a first computing device operated by a first driver, a second computing device operated by a second driver, and a server configured to receive, from the first computing device, a first request for the first driver to participate in conferencing. The server may be configured to determine one or more characteristics of the first driver based on driving behavior data corresponding to a vehicle driven by the first driver, assign the first driver to a conference based on the one or more characteristics of the first driver, receive a second request for the second driver to participate in conferencing from the second computing device, determine that the second driver has at least one characteristic that matches one of the one or more characteristics of the first driver, assign the second driver to the conference with the first driver based on the determination that the second driver has at least one characteristic that matches one of the one or more characteristics of the first driver, and bridge the first computing device operated by the first driver and the second computing device operated by the second driver in the conference.

The disclosure also describes an apparatus comprising at least one processor, a network interface configured to communicate, via a network, with a virtual carpool device, and a memory storing computer-readable instructions that, when executed by the at least one processor, cause the apparatus to receive, from the virtual carpool device, a request for a first driver to participate in conferencing, determine one or more characteristics of the first driver based on driving behavior data corresponding to a vehicle driven by the first driver, assign the first driver to a conference with one or more drivers based on the one or more characteristics of the first driver, and bridge the first driver and the one or more drivers in the conference.

In addition, aspects of this disclosure provide a method that includes receiving, by one or more computing devices and from a virtual carpool device operated by a first driver, a request for the first driver to participate in conferencing, determining, by the one or more computing devices, one or more characteristics of the first driver based on driving behavior data corresponding to a vehicle driven by the first driver, assigning, by the one or more computing devices, the first driver to a conference with one or more drivers based on the one or more characteristics of the first driver, and bridging, by the one or more computing devices, the first driver and the one or more drivers in the conference.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
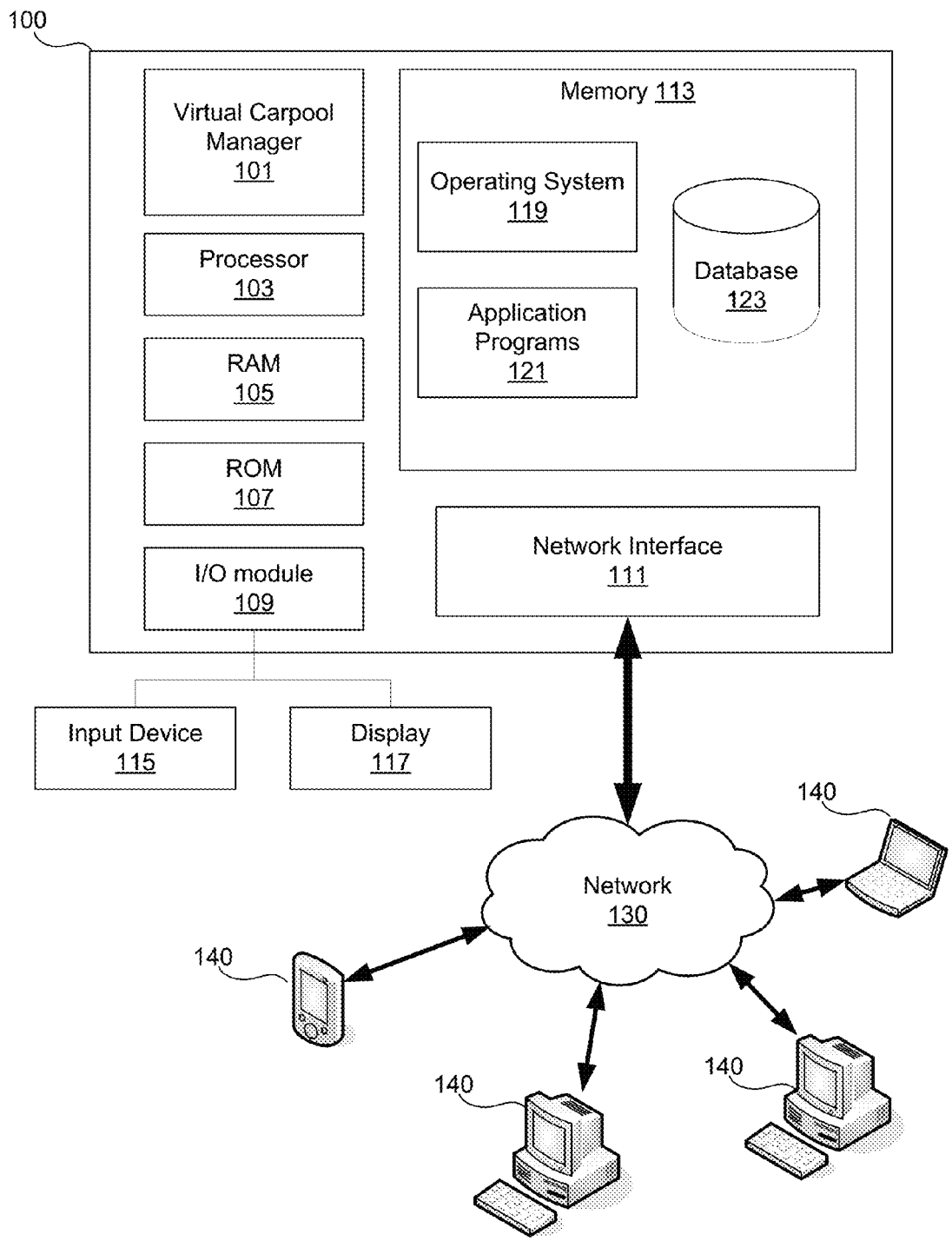
FIG. 1 depicts a block diagram of an example virtual carpool device that may be used in accordance with one or more example embodiments.

In accordance with various aspects of the disclosure, computerized methods, systems, devices, and apparatuses are disclosed that provide a virtual carpool system for receiving requests for drivers to participate in conferencing, determining one or more characteristics for each driver, assigning each driver to a conference with other drivers based on matching characteristics, and allowing communication via a conference between computing devices operated by drivers.

In particular, the present disclosure teaches a virtual carpool system that may be beneficial for allowing drivers to communicate with other drivers in order to make a long commute more bearable and interesting for drivers, wherein the drivers may be grouped together based on driving behavior data and/or listening preferences. The virtual carpool system may be integrated across a plurality of platforms and may be employed by an insurance company that offers virtual carpool benefits to drivers (e.g., insurance policy holders). That is, the insurance company may offer virtual carpool benefits to drivers who are insurance policy holders with registered accounts, wherein the drivers may have opted in for the virtual carpool service or program. The virtual carpool system may bridge drivers together in a virtual carpool (e.g., a conference) so that drivers may communicate with other drivers via respective computing devices. As described herein, the use of the term "virtual carpool" may indicate a conference, teleconference, or voice call that allows drivers to communicate with other drivers with one or more matching characteristics. The one or more matching characteristics may include similar listening preferences, driving behaviors, driving patterns, driving scores, insurance scores, and the like.

In an embodiment, each driver may have and/or operate a virtual carpool device, such as a computing device or a mobile device, which allows a driver to request to join a virtual carpool with one or more drivers. A driver may use a virtual carpool manager or application on his or her virtual carpool device to submit a request to a virtual carpool system (e.g., a server) via a speech or voice input. For example, in the request, the driver may identify one or more preferred conferences or virtual carpools to which the driver wishes to be added. The driver may also specify a number of drivers (e.g., one or more other drivers) with which the driver wishes to be in a conference. In another example, the driver may submit a request to be added to a virtual carpool without identifying any particular preferences.

The virtual carpool system may receive the request from the driver and determine one or more characteristics of the driver based on driving behavior data corresponding to a vehicle driven by the driver. Driving behavior data may include real-time data that is collected by sensors (e.g., accelerometer, GPS, gyroscope, and the like), a telematics device, and/or computing device in the vehicle driven by the driver and may include driving history data formed by collecting such real-time data over a period of time. In an embodiment, the driver may be an owner of the vehicle and/or have access and/or permission to drive the vehicle. The virtual carpool system may determine one or more characteristics of the driver based on the real-time data from the vehicle. For example, the virtual carpool system may determine one or more characteristics of the driver based on driving speeds, acceleration, braking, steering, turn signals, miles driven, amount of time driven at night, amount of time driven during the daytime, and the like.

Based on the one or more characteristics of the driver, the virtual carpool system may assign the driver to a conference with one or more drivers. That is, the virtual carpool system may store information that associates the driver with a particular conference. For example, the virtual carpool system may determine a characteristic of the driver to be that the driver has currently driven and/or has previously driven at or below a designated speed limit on a road. Based on this determined characteristic, the virtual carpool system may store information that associates the driver with a particular conference of one or more drivers who also similarly drive at or below the designated speed limit on a road. According to the assignment, the virtual carpool system may then proceed to bridge the first driver and the one or more drivers in the particular conference. In another example, the virtual carpool system may determine a characteristic of the driver to be that the driver primarily travels at night according to the driver's amount of time driven at night. Based on this determined characteristic, the virtual carpool system may store information assigning the driver to a particular conference of one or more drivers who also primarily drive at night. The virtual carpool system may then bridge the driver with the one or more drivers in the particular conference in order to facilitate communication amongst the drivers while traveling at night.

The virtual carpool system may also determine one or more characteristics of the driver further based on listening preferences of the driver. For example, the driver may submit a request to be added to a conference by using his or her virtual carpool device (e.g., mobile device). After transmitting the request to the virtual carpool system, the virtual carpool device may detect audio playing in the vehicle driven by the driver. The virtual carpool device may send information about the detected audio to the virtual carpool system, wherein the virtual carpool system may determine listening preferences of the driver based on the information about the detected audio by the virtual carpool device. In some embodiments, the listening preferences may comprise data regarding a radio station, artist, song, genre, radio personality, or podcast playing in the vehicle at the time that the request was initially submitted by the driver (or shortly before, e.g., within the past five minutes, or shortly thereafter). Listening preferences may also be determined based on conversations that take place among passengers (including the driver) in the vehicle (e.g., at or around the time of the request was initially submitted by the driver). The virtual carpool system may assign the driver to a conference with one or more other drivers who share similar listening preferences with the driver. Thus, the drivers in the conference may be able to communicate regarding their shared listening preferences.

In another embodiment, the virtual carpool system may collect driving behavior data corresponding to the vehicle driven by a driver over a predetermined period of time. For example, the predetermined period of time may correspond to a billing cycle or billing period associated with an insurance policy of the driver. That is, the driver may be identified on an insurance policy that insures the vehicle, and the virtual carpool system may collect the driving behavior data over the billing period associated with the insurance policy. The virtual carpool system may determine one or more driving patterns of the driver based on the collected driving behavior data over the predetermined period of time. For example, the virtual carpool system may determine that the driver typically drives at speeds of 80 mph on particular routes, such as on highways, according to the collected driving behavior data. In another example, the virtual carpool system may determine that the driver often engages in sudden braking when traveling on highways. Based on the one or more determined driving patterns, the virtual carpool system may determine one or more characteristics of the driver. The virtual carpool system may then use the one or more characteristics of the driver to determine to which conference to assign the driver.

Furthermore, the virtual carpool system may receive requests to participate in conferencing from multiple drivers. In some embodiments, the virtual carpool system may receive a different request from each of a plurality of drivers, wherein each driver may be assigned to a particular conference based on one or more characteristics associated with each driver. For example, the virtual carpool system may receive a first request for a first driver to participate in conferencing and may determine one or more characteristics of the first driver corresponding to a vehicle driven by the first driver. The virtual carpool system may then assign the first driver to a conference based on the one or more characteristics. After the first assignment, the virtual carpool system may receive a second request for a second driver to participate in conferencing. The virtual carpool system may determine whether or not the second driver has at least one characteristic that matches with the one or more characteristics of the first driver. The one or more characteristics may be based on driving behavior data, driving patterns, listening preferences, driving scores, insurance scores, interests, preferences, and the like.

If the second driver shares at least one matching or similar characteristic with the first driver, the virtual carpool system may assign the second driver to the conference with the first driver. The virtual carpool system may then bridge a first computing device operated by the first driver and a second computing device operated by the second driver in the conference. In some embodiments, the conference may comprise one or more additional drivers who each have at least one matching characteristic with the first driver and/or the second driver. Thus, the virtual carpool system may also bridge the first computing device, the second computing device, and respective devices associated with each of the one or more additional drivers in the conference.

If the second driver does not share at least one matching or similar characteristic with the first driver, the virtual carpool system may assign the second driver to a second conference with one or more other drivers. The virtual carpool system may then bridge the second computing device with the other respective devices associated with each of the other one or more drivers in the second conference. By using characteristics to match drivers together in conferences, the virtual carpool system may allow various drivers to communicate and have interesting conversations about a variety of topics in order to make long commutes more enjoyable for the drivers. The virtual carpool system may allow drivers to engage in stimulating conversations with other drivers by grouping drivers together in virtual carpools based on similar characteristics. Instead of a random grouping, the virtual carpool system may allow drivers with shared interests or common characteristics to be in the same conference together.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example virtual carpool device 100 that may be used in accordance with aspects of the present disclosure. The virtual carpool device 100 is a specialized computing device programmed and/or configured to perform and carry out aspects associated with requesting and providing virtual carpools for drivers as described herein. The virtual carpool device 100 may have a virtual carpool manager 101 configured to perform methods and execute instructions as described herein. The virtual carpool manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the virtual carpool manager 101 may refer to the software (e.g., a computer program or application) and/or hardware used to determine characteristics and/or preferences of drivers and assign the drivers to various virtual carpools based on the characteristics and/or preferences. Specifically, the virtual carpool manager 101 may be a part of a virtual carpool system that assigns drivers to virtual carpools and facilitates communication among the drivers by bridging devices in conferences. The one or more specially configured processors of the virtual carpool manager 101 may operate in addition to or in conjunction with another general processor 103 of the virtual carpool device 100. In some embodiments, the virtual carpool manager 101 may be a software module executed by one or more general processors 103. Both the virtual carpool manager 101 and the general processor 103 may be capable of controlling operations of the virtual carpool device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the virtual carpool device 100 may provide input data. The I/O module 109 may also be configured to be connected to a display device 117, such as a monitor, television, touchscreen, and the like, and may include a graphics card. The display device 117 and input device 115 are shown as separate elements from the virtual carpool device 100, however, they may be within the same structure.

Using the input device 115, system administrators may update various aspects of the virtual carpool system, such as rules or information related to determining one or more characteristics of drivers (e.g., based on driving behaviors, listening preferences, driving patterns, driving scores, insurance scores, and the like), matching similar characteristics between drivers, assigning drivers to virtual carpools, and bridging drivers in the virtual carpools or conferences. On some virtual carpool devices 100, the input device 115 may be operated by users (e.g., drivers associated with a vehicle) to interact with the virtual carpool system, including submitting requests to participate in virtual carpooling, providing or updating preferences for a requested virtual carpool, sending contact information to other drivers, requesting or viewing contact information of other drivers, updating account information, and the like, as described herein. In an embodiment, the input device 115 may include a microphone that allows drivers to verify or submit information by speech inputs. Additionally or alternatively, the display device 117 may allow drivers to confirm or view their inputs.

The memory 113 may be any computer readable medium for storing computer executable instructions (e.g., software). The instructions stored within memory 113 may enable the virtual carpool device 100 to perform various functions. For example, memory 113 may store software used by the virtual carpool device 100, such as an operating system 119 and application programs 121, and may include an associated database 123.

The network interface 111 allows the virtual carpool device 100 to connect to and communicate with a network 130. The network 130 may be any type of network, including a local area network (LAN) and/or a wide area network (WAN), such as the Internet. Through the network 130, the virtual carpool device 100 may communicate with one or more computing devices 140, such as laptops, notebooks, smartphones, personal computers, servers, and the like. The computing devices 140 may include at least some of the same components as virtual carpool device 100. In some embodiments the virtual carpool device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a virtual carpool device 100. In other embodiments, the virtual carpool device 100 may include fewer or more elements. For example, the virtual carpool device 100 may use the general processor(s) 103 to perform functions of the virtual carpool manager 101, and thus, might not include a separate processor or hardware for the virtual carpool manager 101. Additionally, or alternatively, the virtual carpool device 100 may be a mobile device (e.g., a smartphone, tablet, and the like) specially configured to perform or carry out aspects of virtual carpooling described herein, and thus, may also include various other components, such as a battery, speaker, and/or antennas (not shown). Also, the virtual carpool device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the virtual carpool device 100 may be a vehicle's computer or a device plugged into the vehicle's computer for use in vehicle telematics.

Figure 2:
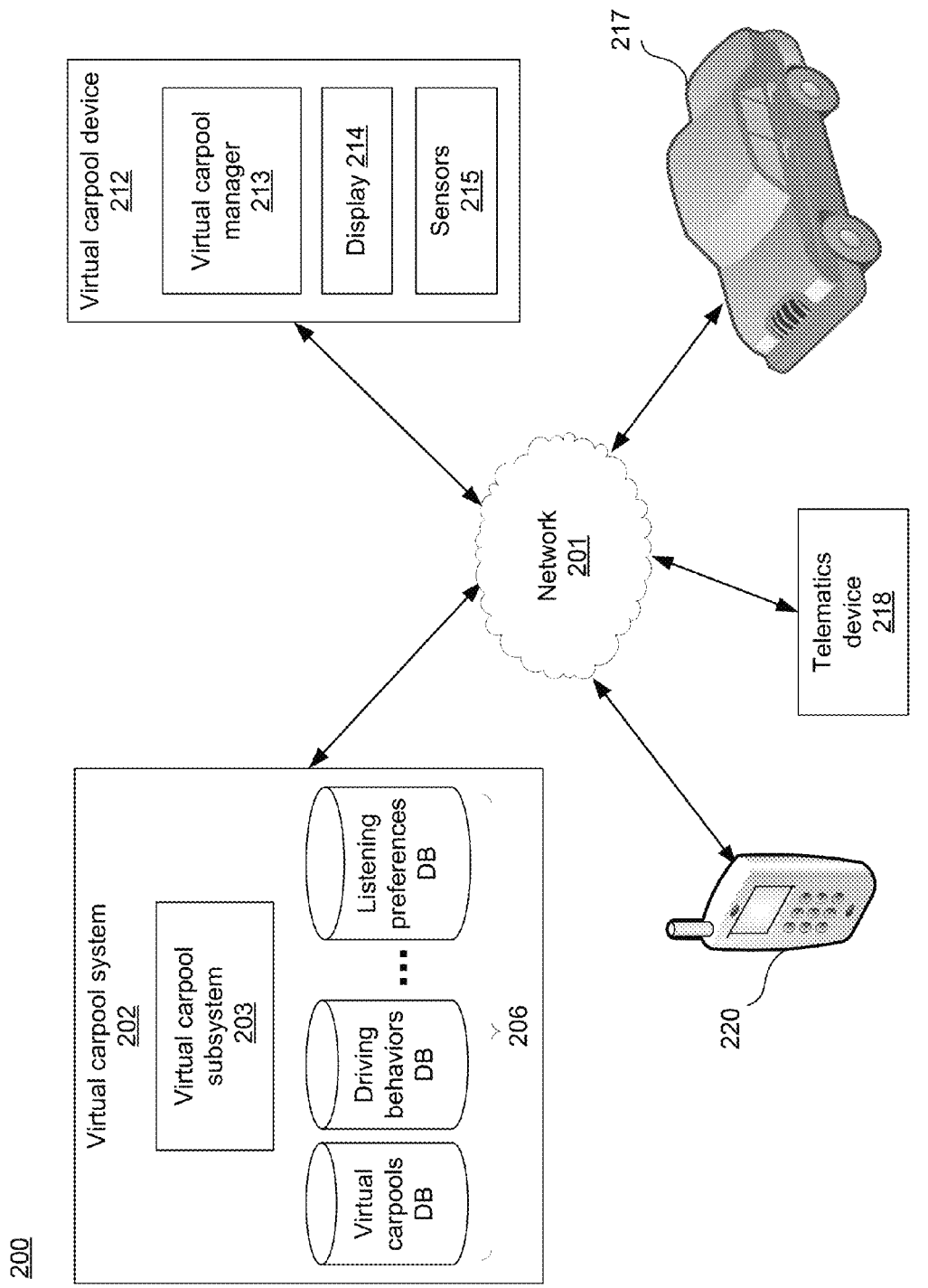
FIG. 2 depicts an example network environment in which various aspects of the present disclosure may be implemented in accordance with one or more example embodiments.

The computerized methods for providing virtual carpool features and assigning drivers to virtual carpools as disclosed herein may be implemented on one or more virtual carpool devices 100 used in various network environments. FIG. 2 illustrates an example network environment 200 for implementing methods in accordance with aspects of the present disclosure.

As shown in FIG. 2, the network environment 200 may include a network 201 configured to connect a virtual carpool system 202, virtual carpool device 212, vehicle 217, telematics device 218, and mobile device 220. The virtual carpool device 212 may be the same as or at least similar to the virtual carpool device 100 described above with reference to FIG. 1. Collectively, these specialized computing devices may form at least a part of a virtual carpool system. Although only one of each of the components 212, 217, 218, and 220 are shown in FIG. 2, it is understood that there may be any number of components 212, 217, 218, and 220 in the network environment 200.

The network 201 may be any type of network, like the network 130 described above, and may use one or more communication protocols (e.g., protocols for the Internet (IP), Bluetooth, cellular communications, satellite communications, and the like) to connect computing devices and servers within the network environment 200 so they may send and receive communications between each other. In particular, the network 201 may include a cellular network and its components, such as cell towers. Accordingly, for example, a mobile device 220 (e.g., a smartphone) or a virtual carpool device 212 of a driver associated with vehicle 217 may communicate, via a cellular backhaul of the network 201, with a virtual carpool system 202 to request for the driver to participate in virtual carpooling or conferencing.

In another example, the mobile device 220 or the virtual carpool device 212 of the driver associated with vehicle 217 may communicate, via a cellular backhaul of the network 201, with the virtual carpool system 202 to submit preferences regarding a virtual carpool. And, in the opposite direction, the virtual carpool system 202 may communicate, via the cellular backhaul of the network 201, with the mobile device 220 or the virtual carpool device 212 to notify the user (e.g., the driver associated with vehicle 217) of the mobile device 220 or virtual carpool device 212 of being assigned to a virtual carpool. In another embodiment, the mobile device 220 and/or virtual carpool device 212 may communicate back and forth with the virtual carpool system 202 over the Internet, such as through a web portal. As shown in FIG. 2, it should be understood that the mobile device 220 or virtual carpool device 212 may connect to the network 201 even if it is removed from the vehicle 217.

In an embodiment, there may be multiple vehicles 217 that are covered by an insurance policy of one individual. Although FIG. 2 illustrates only one vehicle 217, the virtual carpool system may be configured to communicate with multiple vehicles 217 simultaneously (e.g., at or around the same time), wherein multiple vehicles 217 may be associated with multiple individuals. The virtual carpool system 202 may receive requests to join virtual carpools from multiple drivers simultaneously, assign the multiple drivers to various virtual carpools simultaneously, notify the multiple drivers of the virtual carpool assignments simultaneously, and bridge the multiple drivers in the various virtual carpools simultaneously. Also, although FIG. 2 depicts the vehicle 217 as a car, the vehicle 217 may be any type of vehicle, including a motorcycle, bicycle, scooter, drone (or other automated device), truck, bus, boat, plane, helicopter, and the like.

In an embodiment, there may be a driver associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. A driver of the vehicle 217 may also be associated with and operate a virtual carpool device 212. In an embodiment, the virtual carpool device 212 may be a specialized mobile device (e.g., mobile phone), a tablet, laptop, personal computer, and the like configured to perform or carry out aspects associated with virtual carpooling described herein. For example, the virtual carpool device 212 may be the same as the mobile device 220 depicted in FIG. 2. The virtual carpool device 212 may belong to a driver, individual, or customer of an insurance company who is enrolled in a virtual carpool service. Although only one virtual carpool device 212 is illustrated in FIG. 2, there may be any number of virtual carpool devices 212, wherein each virtual carpool device 212 is associated with at least one driver. The virtual carpool device 212 may further comprise a virtual carpool manager 213, a display 214, and sensors 215. In the case of a virtual carpool device 212 that is installed in or connected to a vehicle, the individual is considered to operate that virtual carpool device by performing the installation or connection of that device in or at the vehicle.

The virtual carpool device 212 may be configured to execute the virtual carpool manager 213 that presents a user interface (e.g., a graphical user interface for a website, application, software program, and the like) on the display 214. The display 214 may comprise a monitor, television, touchscreen, and the like. The user interface of the virtual carpool manager 213 may allow drivers to send requests to participate in conferencing, send and/or receive contact information from other drivers, and receive notifications about virtual carpools as provided by the virtual carpool system 202. The virtual carpool manager 213 may be a self-sufficient program or may be a module of another program, such as a program used to collect and/or evaluate driver information representing actions of a vehicle 217, driving behavior of a driver associated with a vehicle 217, and/or status updates of a vehicle 217. The virtual carpool manager 213 may have access to driving behavior data that is collected by the sensors 215 of the virtual carpool device 212. The sensors 215 may comprise various sensors and/or modules that detect driving behaviors, environmental information, and/or other risk-related factors of a driver of a vehicle 217. For example, the sensors 215 may comprise an accelerometer, GPS, gyroscope, and the like. In an embodiment, the sensors 215 may detect driving behaviors corresponding to a vehicle 217 operated by a driver in order to determine to which virtual carpool to assign the driver. The virtual carpool device 212 may also have additional components, such as a microphone and an analog to digital converter for capturing and processing listening preferences.

In an embodiment, the virtual carpool manager 213 may be downloaded or otherwise installed onto the virtual carpool device 212 using known methods. Different devices may install different versions of the virtual carpool manager 213 depending on their platform. For example, a virtual carpool device 212 (e.g., a smartphone) running the iOS™ operating system may download a different version of the virtual carpool manager 213 than a virtual carpool device 212 running the ANDROID™ operating system.

A driver may launch the virtual carpool manager 213 by, for example, operating buttons or a touchscreen on the virtual carpool device 212. Additionally, or alternatively, the virtual carpool device 212 may be configured to execute a web browser (e.g., an application for accessing and navigating the Internet) to access a web page providing an interface for the virtual carpool system. In some embodiments, the virtual carpool device 212 may also be configured to collect information, such as driving behavior data. For example, the virtual carpool manager 213 or another program installed on the virtual carpool device 212 may instruct the virtual carpool device 212 to collect driving behavior data using the sensors 215 (e.g., its accelerometer, GPS, gyroscope, and the like). Driving behavior data may comprise data that is indicative of driving behaviors that are collected from a vehicle while driving. Driving behavior data may include vehicle telematics data or any other data related to events occurring during a vehicle's trip (e.g., an impact to a part of the vehicle, a deployed airbag, and the like). Driving behavior data may also include location information, such as GPS coordinates, indicating the geographical location of the virtual carpool device 212. The virtual carpool manager 213 or another program installed on the virtual carpool device 212 may collect driving behavior data over a predetermined period of time and determine one or more driving patterns based on the collected driving behavior data. The virtual carpool manager 213 or another program may determine one or more characteristics of a driver based on the one or more determined driving patterns and assign the driver to a conference based on the one or more characteristics. A driver associated with the vehicle 217 and associated with the virtual carpool device 212 may employ the virtual carpool manager 213 to send and/or access at least one of virtual carpool requests, virtual carpool information, contact information, account information, and settings/preferences related to the vehicle 217.

Additionally, FIG. 2 also illustrates a telematics device 218 connected to the network 201. In an embodiment, the telematics device 218 may be referred to as a vehicle computing device that is associated with the vehicle 217 and the mobile device 220. In some embodiments, the mobile device 220 and telematics device 218 may communicate with one another (e.g., via Bluetooth). The mobile device 220 may be any mobile device (e.g., a smartphone, tablet, and the like) that is associated with a driver or passenger of the vehicle 217. In particular, the mobile device 220 may belong to a driver of the vehicle 217, wherein the driver is a customer of an insurance company and enrolled in a service that allows the driver to participate in virtual carpool services. The mobile device 220 may be configured similarly to the virtual carpool device 212 and may interface with the telematics device 218.

The telematics device 218 may be configured to execute a virtual carpool manager that presents a user interface for a customer to provide inputs to and receive outputs from the virtual carpool system 202. The virtual carpool manager 213 may be downloaded or otherwise installed onto the telematics device 218 using known methods. Once installed onto the telematics device 218, a driver may launch the virtual carpool manager 213 by, for example, operating buttons or a touchscreen on the dashboard of the vehicle 217. Additionally, or alternatively, the telematics 218 may be configured to execute a web browser to access a web page providing an interface for the virtual carpool system 202.

In some embodiments, the telematics device 218 may be a device that is plugged into the vehicle's 217 on-board diagnostic (OBD) system (e.g., plugged in through an OBD II connector) or otherwise installed in the vehicle 217 in order to collect driving behavior data using, e.g., its accelerometer, GPS, gyroscope, or any other sensor (either in the telematics device 218 or the vehicle 217). As mentioned above, this driving behavior data may include vehicle telematics data or any other data related to events occurring during a vehicle's trip (e.g., an impact to a part of the vehicle 217, a deployed airbag, or other event triggered by a sensor 215 of the vehicle 217). The vehicle 217 may have a GPS installed therein, and therefore, the telematics device 218 may also collect GPS coordinates. Alternatively, the telematics device 218 may include its own GPS receiver.

Further, the telematics device 218 may include multiple devices. For example, the telematics device 218 may include the vehicle's OBD system and other computers of the vehicle 217. The telematics device 218 may be configured to interface with one or more vehicle sensors (e.g., fuel gauge, tire pressure sensors, engine temperature sensors, and the like). The telematics device 218 may also interface with the mobile device 220 via a wired connection (e.g., USB, OBD II connector, and the like) or a wireless connection (e.g., Bluetooth). In some embodiments, there might not be a telematics device 218 installed in the vehicle 217 that is configurable to interface with the virtual carpool system 202, or the telematics device 218 might not be able to communicate with the mobile device 220. Still, in some cases, the telematics device 218 might be configured so that it only communicates with the mobile device 220 within the same vehicle 217.

In an embodiment, both a telematics device 218 and a mobile device 220 (or a virtual carpool device 212) may be employed, whereas in another embodiment, only one of these devices may be used with the virtual carpool system to collect driving behavior data. For example, a driver associated with the vehicle 217 may choose whether he or she wishes to use his or her mobile phone to capture driving behavior data or whether he or she wishes to have a device plugged into the vehicle 217 to collect driving behavior data.

FIG. 2 also illustrates example subsystems within the network environment 200. That is the virtual carpool system 202 may comprise a virtual carpool subsystem 203 and a plurality of databases 206. The virtual carpool subsystem 203 may include one or more application servers, computing devices, and other equipment (e.g., conference bridge equipment) used by company (e.g., insurance company) personnel to implement and provide the virtual carpool services described herein. For example, the virtual carpool subsystem 203 may include a virtual carpool assignment module that is configured with programmed instructions to assign a driver of the vehicle 217 to a virtual carpool based on one or more characteristics of the driver, notify the driver of the virtual carpool assignment, and bridge the driver with one or more other drivers in the virtual carpool. For example, the virtual carpool assignment module may update a virtual carpool or conference assignment associated with a virtual carpool account. The virtual carpool assignment module may associate the conference assignment with the virtual carpool account by identifying an account number or another unique identifier for the account. The conference assignment may be stored as a conference assignment record in a database (e.g., database 206) of the virtual carpool system 202, wherein the conference assignment record may be associated with driver or customer records stored in the database. For example, the conference assignment record may identify a unique identification number for a driver or customer. In another example, the conference assignment record may include a field for each associated driver or customer assigned to the conference. The virtual carpool assignment module may update the conference assignment by inserting one or more identifiers in the field for each driver assigned to the conference.

The virtual carpool assignment module may also be configured with programmed instructions to determine one or more characteristics of a driver based on driving behavior data corresponding to the vehicle 217 driven by the driver or based on listening preferences data of the driver. For example, the virtual carpool assignment module may update or store information regarding driving behavior data and listening preferences data of a driver associated with a virtual carpool account (e.g., in a database 206). The virtual carpool assignment module may associate driving behavior data and listening preferences data with the virtual carpool account by identifying an account number or another unique identifier for the account. The driving behavior data and listening preferences data may be associated with driver or customer records stored in the database.

The virtual carpool subsystem 203 may include functionality that may be distributed among a plurality of computing devices. For example, the virtual carpool subsystem 203 may comprise further subsystems, including client-side subsystems and server-side subsystems. The client-side subsystem may interface with the virtual carpool device 212, telematics device 218, and/or mobile device 220, whereas the server-side subsystem may interface with application servers and computing devices which handle a variety of tasks related to the assignment of virtual carpools and management of virtual carpool services.

The subsystems, application servers, and computing devices of the virtual carpool subsystem 203 may also have access to the plurality of databases 206. In an embodiment, the plurality of databases 206 may be incorporated into the virtual carpool subsystem 203 or may be separate components in the virtual carpool subsystem 203. As an example, the plurality of databases 206 may comprise a virtual carpools database, a driving behaviors database, a listening preferences database, an accounts and billing database and other databases. A database 206 may comprise information regarding at least one of the assignment of virtual carpools, driving behaviors, listening preferences, driver information, or account and billing information. For example, a database 206 may store a record of which virtual carpools a driver has been assigned to, as well as a driver's preferences for different virtual carpools (e.g., based on driving behaviors, listening preferences, interests, etc.). In an embodiment, the virtual carpool subsystem 203 may use the information stored in the plurality of databases 206 to send notifications to drivers regarding various virtual carpools to join based on the drivers' interests. The data stored in the plurality of databases 206 may be collected and compiled by the virtual carpool device 212, the telematics device 218, the virtual carpool subsystem 203, or by servers and subsystems within the virtual carpool subsystem 203.

Figure 3:
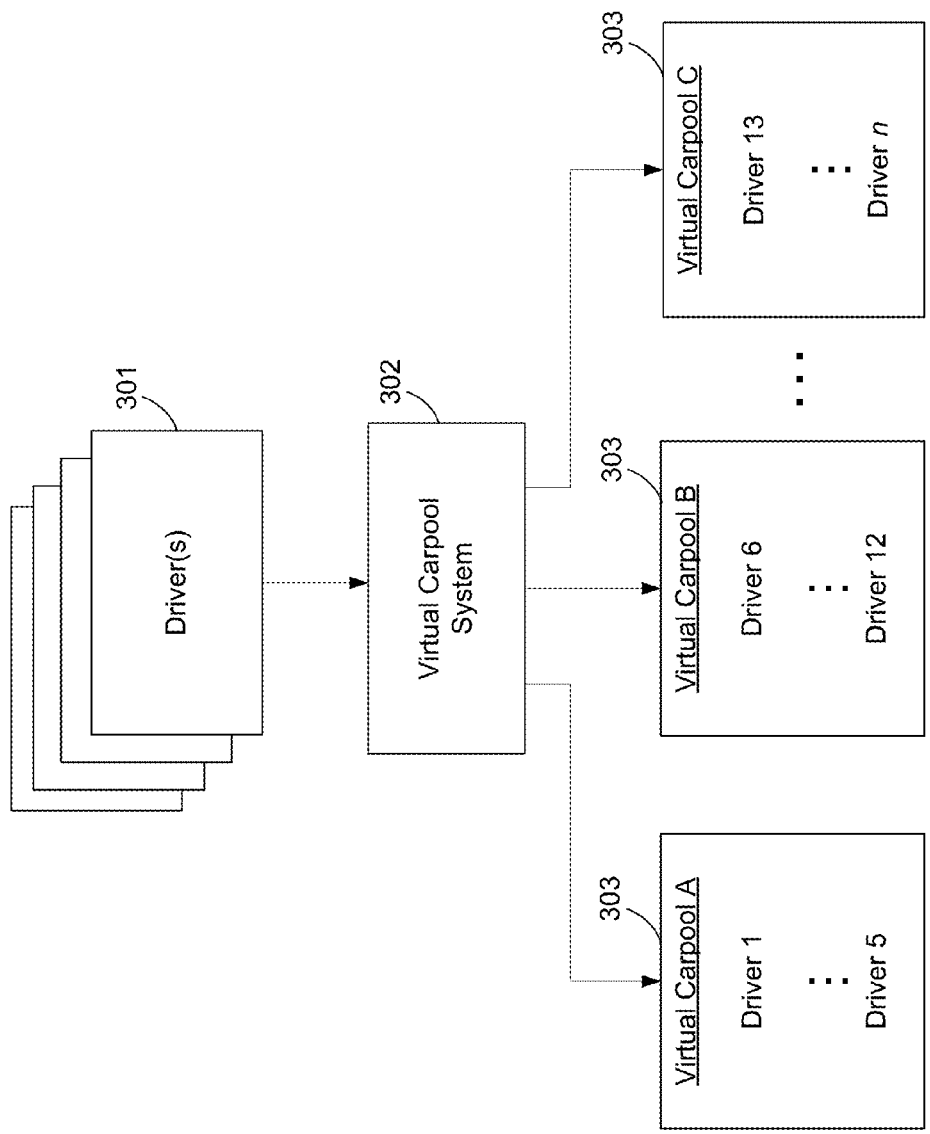
FIG. 3 depicts a block diagram of an example of virtual carpool assignment in accordance with one or more example embodiments.

FIG. 3 illustrates a block diagram of an example of virtual carpool assignment in accordance with aspects of the present disclosure. Specifically, FIG. 3 illustrates examples of a plurality of drivers 301 being assigned to various virtual carpools 303 (e.g., virtual carpools A, B, and C) by a virtual carpool system 302. The virtual carpool system 302 may be the same as or at least similar to the virtual carpool system 202 illustrated in FIG. 2. The plurality of drivers 301 may communicate with each other in the virtual carpool system 302 through a computing device, such as virtual carpool device 100. Additionally and/or alternatively, the plurality of drivers 301 may each be associated with a different vehicle (e.g., vehicle 217) and may each communicate with other drivers in the virtual carpool system 302 by one or more of the virtual carpool device 212, telematics device 218, and/or mobile device 220. Each virtual carpool 303 may have the same number of drivers 301 or a different number of drivers 301 assigned to each virtual carpool 303 by the virtual carpool system 302. As an example, virtual carpool A comprises five drivers, whereas virtual carpool B comprises six drivers, as illustrated in FIG. 3. The virtual carpool system 302 may assign any number of drivers 301 to different virtual carpools 303 based on one or more characteristics of each driver 301.

In an embodiment, the virtual carpool system 302 may assign drivers 301 to the same virtual carpool 303 based on one or more characteristics, such as interests, listening preferences, driving behaviors, driving scores, insurance scores, and the like. For example, the virtual carpool system 302 may determine that a subset of drivers 301 have similar interests and assign the subset of drivers 301 to the same virtual carpool 303. Interests may comprise sports interests, music, hobbies, traveling interests, and other preferences specified by the driver 301. For example, the driver 301 may specify his or her interests prior to submitting a request to the virtual carpool system 302 in order to participate in conferencing. In another embodiment, the virtual carpool system 302 may determine that a subset of drivers 301 have similar listening preferences and assign the subset of drivers 301 to the same virtual carpool 303. Listening preferences may be based on data regarding music interests previously identified by the driver 301 or data regarding audio currently playing in the driver's vehicle. For example, each driver 301 may provide information identifying at least one of his or her favorite music, radio station(s), artist(s), song(s), genre(s), radio personalities, or podcasts prior to participating in virtual carpooling. The virtual carpool system 302 may assign drivers 301 to specific virtual carpools 303 based on this information. Additionally, the driver 301 may submit a request to the virtual carpool system 302 in order to be placed in a virtual carpool 303 based on detected audio playing in the vehicle driven by the driver 301. The virtual carpool system 302 may detect the audio in the driver's vehicle, determine listening preferences of the driver 301 based on the detected audio, and assign the driver 301 to a virtual carpool 303 accordingly. This feature may allow drivers 301 to be able to discuss their favorite music and current songs playing on the radio with other drivers 301 with similar interests while driving.

In another embodiment, the virtual carpool system 302 may assign drivers 301 to a virtual carpool 303 based on collected driving behavior data. That is, the virtual carpool system 302 may collect driving behavior data corresponding to the vehicle driven by a driver 301 over a predetermined period of time (e.g., a day, a week, a month, a billing cycle, or another period of time). For example, driving behaviors associated with a driver 301 may comprise speeding, braking, steering, turn signals, miles driven, amount of time driven at night, amount of time driving during daytime, and the like. The virtual carpool system 302 may determine one or more driving patterns of the driver 301 based on the collected driving behavior data over the predetermined period of time. A driving pattern may represent driving behaviors that are repeated over the predetermined period of time. Based on the one or more driving patterns, the virtual carpool system 302 may assign the driver 301 to a corresponding virtual carpool 303. For example, the virtual carpool system 302 may determine that the driver 301 generally drives below or above the speed limit. The virtual carpool system 302 may thus assign the driver 301 to a virtual carpool 303 with other drivers 301 who also similarly drive below or above the speed limit. In some cases, the virtual carpool 302 may assign a driver 301 who drives above the speed limit with other drivers 301 who drive below or at the speed limit in order to promote discussions regarding safe driving. For example, the other drivers 301 who drive below or at the speed limit may encourage the driver 301 to drive safely without speeding.

In another example, the virtual carpool system 302 may determine that a driver 301 often drives a certain route each day, such as on his way home or on his way to work. The virtual carpool system 302 may thus assign the driver 301 to a virtual carpool 303 with other drivers 301 who travel a similar route as the driver 301 so that the drivers may discuss road conditions regarding the similar route, including traffic conditions, road and/or lane closures, weather-related issues, and the like. In yet another example, the virtual carpool system 302 may determine that the driver 301 primarily travels during nighttime or daytime. The virtual carpool system 302 may thus assign the driver 301 to a virtual carpool 303 with other drivers 301 who also travel at similar times as the driver 301. For example, drivers 301 may be able to communicate in a virtual carpool 303 while they all travel at night. This feature may allow drivers 301 to keep each other awake by engaging in conversations in a virtual carpool 303 during late hours of traveling.

In another embodiment, the virtual carpool system 302 may assign drivers 301 to a virtual carpool 303 based on driving scores. In an embodiment, driving scores may comprise scores for a plurality of driving behaviors associated with a driver 301. For example, driving scores may be calculated based on speed, braking, steering, turn signals, miles driven, amount of time driven at night, amount of time driven during daytime, and the like. The driving scores may be calculated on an hourly, daily, weekly, monthly, or any other periodic basis and may be used by an insurance company to evaluate drivers 301 for various purposes. In some cases, a high driving score may represent safe driving behaviors, whereas a low driving score may represent unsafe driving behaviors. The virtual carpool system 302 may employ the driving scores to determine to which virtual carpool to assign a driver 301. For example, the virtual carpool system 302 may assign drivers 301 who have each received a driving score within the a range of 95-100 in a first virtual carpool 303, drivers 301 who have each received a driving score within a score range of 90-94 in a second virtual carpool 303, and drivers 301 who have each received a driving score within a score range of 80-89 in a third virtual carpool 303. In another embodiment, the virtual carpool system 302 may assign drivers 301 with different driving scores to the same virtual carpool 303. For example, the virtual carpool 302 may assign a first driver 301 with a driving score within a score range of 80-89 in the same virtual carpool 303 as a second driver 301 with a driving score within a score range of 95-100. This grouping may allow drivers 301 with different or higher driving scores to discuss and/or share with other drivers 301 how they received particular driving scores based on specific driving behaviors.

In an embodiment, driving scores may be different from or the same as insurance scores, which may be used to determine insurance premiums or insurance deductibles. In some cases, insurance scores may be calculated from driving scores, and the virtual carpool system 302 may utilize the insurance scores to assign drivers 301 to various virtual carpools 303. In some embodiments, the virtual carpool system 302 may match drivers 301 based on one or more common characteristics and assign drivers 301 with common interests to the same virtual carpool 303. Additionally and/or alternatively, the virtual carpool system 302 may assign drivers 301 with different interests to the same virtual carpool 303. For example, this feature of the virtual carpool system 302 may allow drivers with different backgrounds or different interests to communicate with other drivers in a virtual carpool 303 through a conference call.

Additionally, drivers 301 may be able to rate other drivers 301 in a virtual carpool 303 after or during a conference call. Drivers 301 may rate other drivers 301 based on the quality of the conversations during the conference call, such as topics discussed, whether or not the driver 301 enjoyed the conversation with one or more particular drivers 301, and whether or not the driver 301 wishes to converse again in another conference call with the one or more particular drivers 301 in the virtual carpool. In some cases, a driver 301 may rate another driver 301 with either a higher rating or a lower rating based on their behavior or interactions during the conference call. For example, the driver 301 may submit a higher rating if he or she enjoyed conversations with the other driver 301. Alternatively, the driver 301 may submit a lower rating if the other driver participated in poor conduct or berated fellow drivers during conversations within the conference call. In some embodiments, drivers with lower ratings might not be allowed to participate in conference calls or even join a virtual carpool. That is, drivers with lower ratings may be "benched" from virtual carpool services for a certain period of time. A driver's lower rating may be re-evaluated after the certain period of time has expired, after which the driver may rejoin a virtual carpool or join new virtual carpools. These user ratings may allow the virtual carpool system 302 to receive feedback from drivers 301 and update a virtual carpool assignment module accordingly (e.g., within virtual carpool subsystem 203) to improve virtual carpool assignment functionality of the system. The virtual carpool system 302 may employ user ratings to assign drivers 301 to different virtual carpools 303. That is, the virtual carpool system 302 may group drivers 301 with similar ratings together. For example, the virtual carpool system 302 may group drivers 301 who have received similar high ratings together in a first virtual carpool 303. The virtual carpool system 302 may then group drivers 301 who have received similar low ratings together in a second virtual carpool 303. In another embodiment, the virtual carpool system 302 may group drivers 301 with different ratings together. In some embodiments, the virtual carpool system 302 may group a driver who talks frequently with another driver who talks infrequently (e.g., listens more than talks).

In some cases, a driver 301 may request to be placed in a virtual carpool 303 with other drivers 301 who have each received a rating of a certain value or higher. For example, the driver 301 may indicate this preference and/or other preferences in an initial request to participate in virtual carpooling or conferencing, wherein the request is submitted to the virtual carpool system 302. Another preference may comprise a number of other drivers 301 that the driver 301 wishes to communicate with in a virtual carpool 303. The virtual carpool system 302 may receive and evaluate the driver's request and place the driver 301 in a virtual carpool 303 with other drivers 301 based on the specified preferences. For example, the virtual carpool system 302 may assign the driver 301 to a virtual carpool 303 with drivers 301 who have similar ratings in comparison with the driver 301. In another embodiment, the virtual carpool system 302 may assign drivers 301 with different characteristics to the same virtual carpool 303. For example, the driver 301 might not indicate any preferences when submitting the request to participate in virtual carpooling or conferencing. Thus, the virtual carpool system 302 may assign the driver 301 to a virtual carpool with any number of drivers 301 with different characteristics, interests, ratings, and the like.

After drivers 301 have been assigned to a particular virtual carpool 303, the virtual carpool system 302 may bridge the drivers 301 together in a conference call. That is, the drivers 301 may be able to communicate via a voice call on each of their respective devices (e.g., each driver 301 may operate at least one of a virtual carpool device 212, telematics device 218, or mobile device 220). In some embodiments, only a subset of drivers 301 assigned to a virtual carpool 303 may participate in a conference. For example, some of the drivers 301 assigned to the virtual carpool 303 may be unavailable for a conference call. As another example, some of the drivers 301 assigned to the virtual carpool 303 may wish not to participate in the conference call. Thus, drivers 303 may have an option to reject an incoming conference call, cancel a request to participate in conferencing, or cancel an ongoing conference call with other drivers 301 assigned to a virtual carpool 303.

In another embodiment, a driver 301 may select which other drivers 301 to communicate with in a conference call. For example, the driver 301 may select one or more other drivers 301 to participate in a conference call with him or her, wherein the one or more other drivers 301 may be assigned to the same virtual carpool 303 as the driver 301. The driver 301 may also be able to invite and/or add friends, family members, and other contacts to join him or her in a certain virtual carpool 303. For example, the driver 301 may submit contact information regarding a friend to add to a virtual carpool 303 to the virtual carpool system 302. The contact information may comprise at least one of a name, phone number, or email address associated with the friend. The virtual carpool system 302 may employ the contact information to notify the friend of being added to the virtual carpool 303 with the driver 301.

By employing the virtual carpool system 302, a driver 301 may also be able to obtain contact information from other drivers 301 with whom the driver 301 has communicated in a virtual carpool 303. The driver 301 may also be able to send contact information to other drivers 301 with whom the driver 301 has communicated in a virtual carpool 303. For example, a first driver may wish to communicate again with a second driver and may request to receive contact information from the second driver. If the second driver also wishes to communicate again with the first information, the virtual carpool system 302 may allow the first driver and the second driver to share contact information with each other. That is, the virtual carpool system 302 may send the first driver's contact information to the second driver and the second driver's contact information to the first driver. The contact information may be in the form of an electronic business card (e.g., a vCard) and may comprise names, address, phone numbers, email addresses, photographs, and the like. Thus, the virtual carpool system 302 may allow drivers to interact with and engage in stimulating conversations while driving and ultimately meet other drivers with similar interests.

Figure 4:
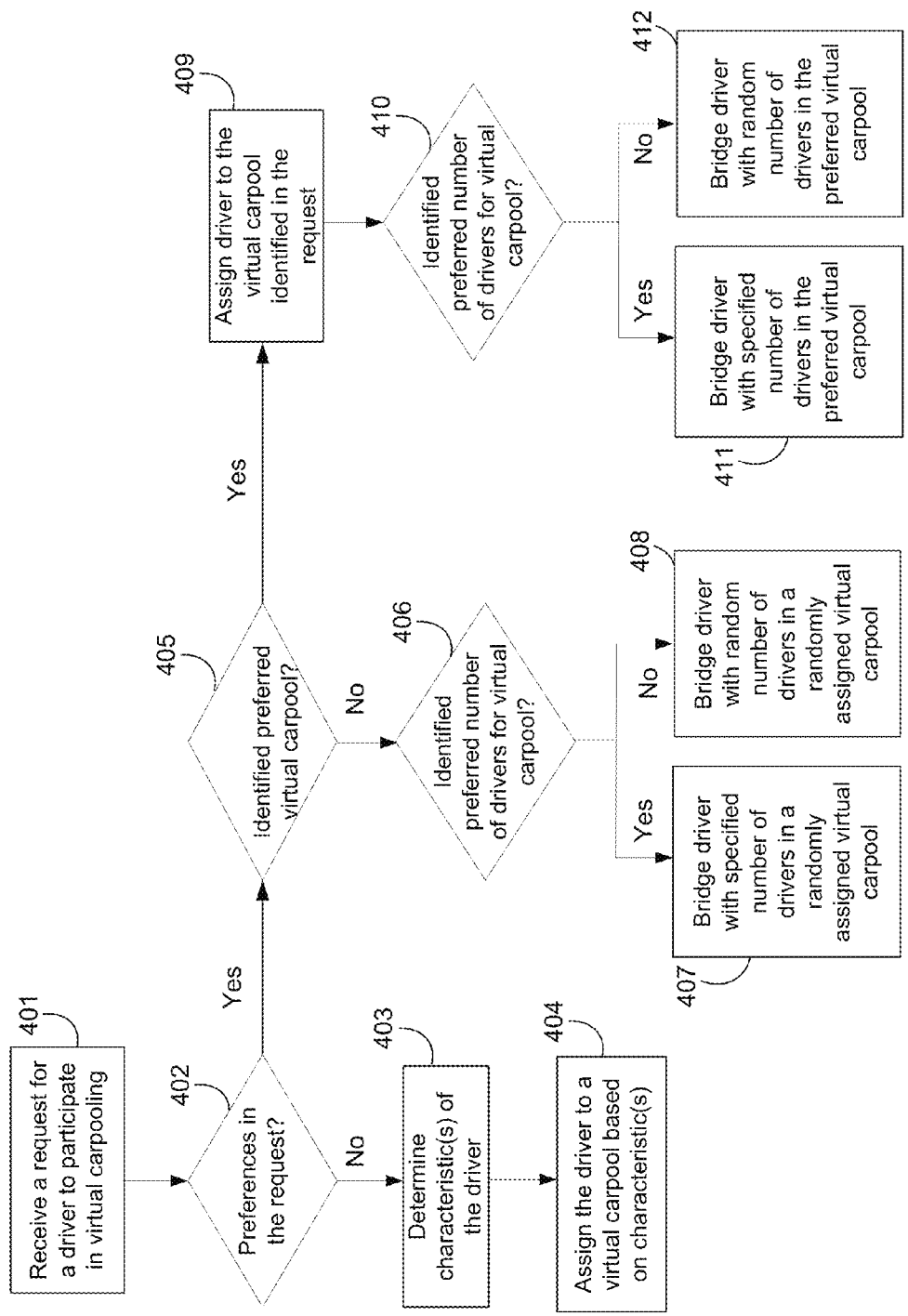
FIG. 4 depicts a flow diagram of example method steps for bridging drivers in virtual carpools in accordance with one or more example embodiments.

FIG. 4 illustrates a flow diagram of an example method in accordance with aspects of the present disclosure. In particular, FIG. 4 illustrates example method steps for assigning and bridging drivers in virtual carpools. The steps of FIG. 4 may be performed by subsystems, application servers, and computing devices of the virtual carpool system 202 (e.g., virtual carpool subsystem 203). One or more of the steps of FIG. 4 may be performed by executing a virtual carpool program (e.g., a virtual carpool mobile application) and/or by operating a particularly configured computing device of the virtual carpool system 202. As a result of the method of FIG. 4, a driver, at virtual carpool device 212 and associated with vehicle 217, may be assigned to a virtual carpool and bridged with other drivers in the virtual carpool.

The method of FIG. 4 may begin with a step of 401 of receiving a request for a driver to participate in virtual carpooling. For example, the virtual carpool system 202 may receive a request for a driver to participate in virtual carpooling, wherein the request is received from the virtual carpool device 212, telematics device 218, and/or mobile device 220. The driver may comprise one of the plurality of drivers 301, and the driver may drive the vehicle 217. Furthermore, the request may be received after the driver has registered for the virtual carpool service or program. For example, the driver may sign up for the virtual carpool service and provide account information (e.g., name, phone number, email address, billing address, and the like). In another embodiment, the request may be received concurrently with the driver's registration for the virtual carpool service or program. At step 402, the virtual carpool system may determine whether or not the driver indicated any preferences in the request received at step 401. For example, the driver may specify preferences regarding a virtual carpool to which the driver wishes to be added. Preferences may be related to a driver's interests, including sports, music, hobbies, traveling interests, and other preferences specified by the driver. Other preferences may include a name or number identifying a preferred virtual carpool or a number of drivers with whom the driver wishes to communicate in a virtual carpool. If the driver has indicated any preferences in the request, then the method in this example proceeds to step 405.

At step 405, the virtual carpool system may determine if the driver has identified a preferred virtual carpool in the preferences in the request. For example, the driver may identify a preferred virtual carpool by name or by another identifier (e.g., a number), wherein the driver wishes to be added to the identified virtual carpool. If the driver has identified a preferred virtual carpool in the request, then the method in this example proceeds to step 409. At step 409, the virtual carpool system assigns the driver the virtual carpool identified in the request. For example, the virtual carpool system may store information in a database (e.g., a database 206) that associates the driver with the virtual carpool identified in the request. At step 410, the virtual carpool system may determine if the driver has identified a preferred number of drivers with whom the driver wishes to communicate in a virtual carpool. For example, the driver may indicate that he or she wishes to be in a virtual carpool with two drivers, five drivers, ten drivers, or any other number of drivers. If the driver has identified a preferred number of drivers in the request, then the method may proceed to step 411, in which the virtual carpool system bridges the driver with the specified number of drivers in the preferred virtual carpool as identified in the request. If the driver has not identified a preferred number of drivers in the request, then the method may proceed to step 412, in which the virtual carpool system bridges the driver with a random number of drivers in the preferred virtual carpool as identified in the request. The random number of drivers may be selected in any manner by the virtual carpool system.

At step 405, if the virtual carpool system determines that the driver has not identified a preferred virtual carpool in the preferences in the request, then the method in this example proceeds to step 406. At step 406, the virtual carpool system may determine if the driver has identified a preferred number of drivers with whom the driver wishes to communicate in any virtual carpool. For example, the driver may indicate that he or she wishes to be in any virtual carpool with two drivers, five drivers, ten drivers, or any other number of drivers. If the driver has identified a preferred number of drivers in the request, then the method may proceed to step 407, in which the virtual carpool system bridges the driver with the specified number of drivers in a randomly assigned virtual carpool. For example, the virtual carpool system may assign the driver to a random virtual carpool with the specified number of drivers, based on one or more characteristics of the driver, such as driving behaviors, listening preferences, or interests of the driver. If the driver has not identified a preferred number of drivers in the request, then the method may proceed to step 408, in which the virtual carpool system bridges the driver with a random number of drivers in a randomly assigned virtual carpool. For example, the virtual carpool system may assign the driver to a random virtual carpool with a random number of drivers, based on one or more characteristics of the driver, such as driving behaviors, listening preferences, or interests of the driver. As previously mentioned, the random number of drivers may be selected in any manner by the virtual carpool system.

At step 402, if the virtual carpool system determines that the driver has not indicated any preferences in the request received at step 401, then the method in this example proceeds to step 403. At step 403, the virtual carpool system may determine one or more characteristics of the driver. For example, the one or more characteristics may include listening preferences, driving behaviors, driving patterns, driving scores, insurance scores, and the like. At step 404, the virtual carpool system may assign the driver to a virtual carpool based on the one or more characteristics. For example, the virtual carpool system may assign the driver to a virtual carpool for drivers who listen to a certain radio station. In another example, the virtual carpool system may assign the driver to a virtual carpool for fast drivers or for slow drivers. In yet another example, the virtual carpool system may assign the driver to a virtual carpool for drivers who are fans of a particular sports team. In some embodiments, the virtual carpool system may receive requests for multiple drivers to participate in virtual carpooling, determine preferences for each of the multiple drivers simultaneously, determine one or more characteristics of each of the multiple drivers simultaneously, and assign each of the multiple drivers to one or more virtual carpools simultaneously. That is, the virtual carpool system may proceed through the steps 401-412, while performing steps with respect to the multiple drivers simultaneously.

Figure 5:
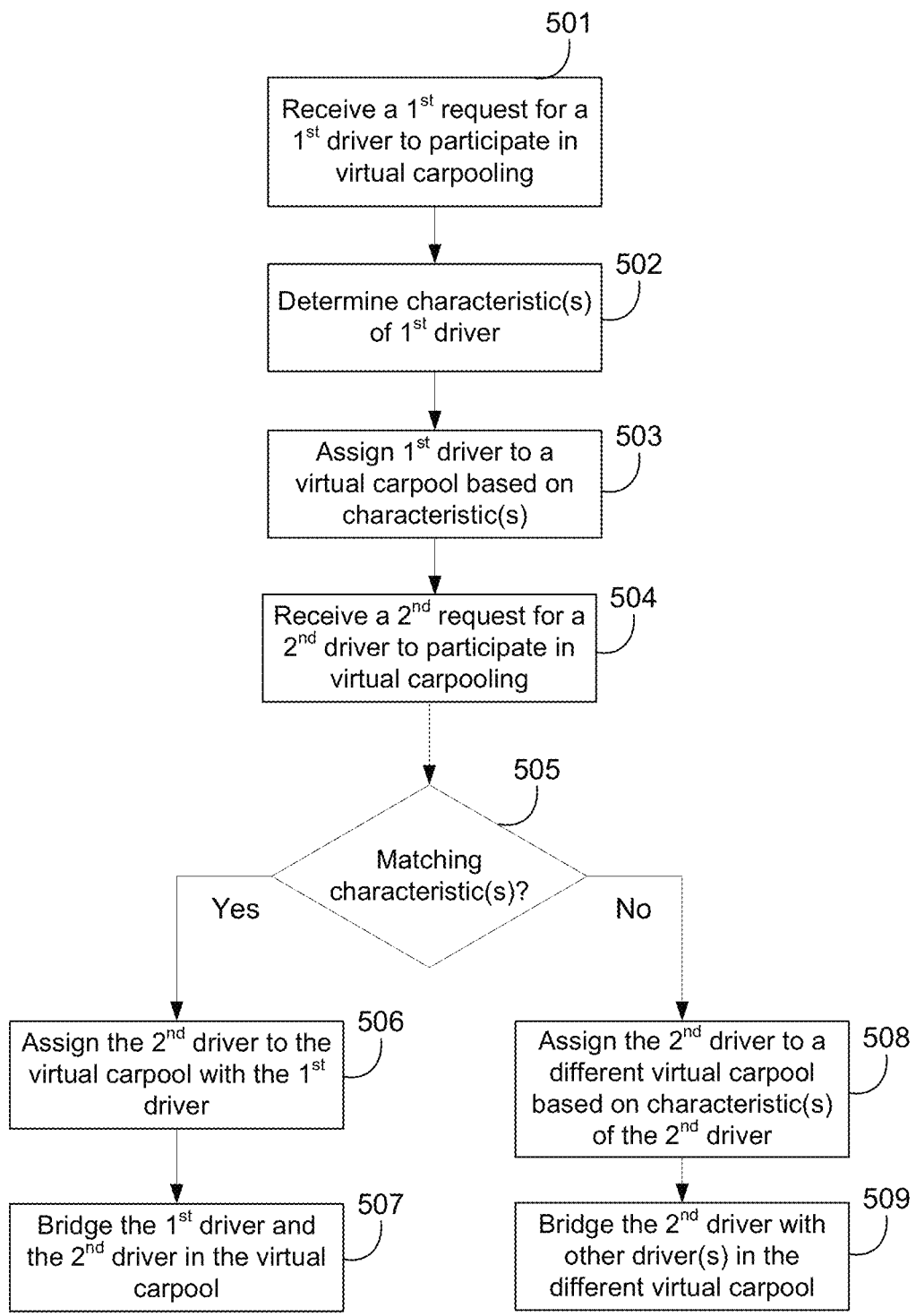
FIG. 5 depicts a flow diagram of example method steps for bridging drivers in virtual carpools in accordance with one or more example embodiments.

FIG. 5 illustrates another flow diagram of an example method in accordance with aspects of the present disclosure. In particular, FIG. 5 illustrates example method steps for assigning and bridging drivers in virtual carpools. The steps of FIG. 5 may be performed by subsystems, application servers, and computing devices of the virtual carpool system 202 (e.g., virtual carpool subsystem 203). One or more of the steps of FIG. 5 may be performed by executing a virtual carpool program (e.g., a virtual carpool mobile application) and/or by operating a particularly configured computing device of the virtual carpool system 202. As a result of the method of FIG. 5, a first driver, at virtual carpool device 212 and associated with vehicle 217, may be assigned to a virtual carpool and bridged with a second driver and/or other drivers in the virtual carpool.

The method of FIG. 5 may begin with a step of 501 of receiving a first request for a first driver to participate in virtual carpooling. For example, the virtual carpool system 202 may receive a first request for a first driver to participate in virtual carpooling, wherein the first request is received from the virtual carpool device 212, telematics device 218, and/or mobile device 220 associated with the first driver. The first driver may comprise one of the plurality of drivers 301, and the first driver may drive a first vehicle (e.g., vehicle 217). At step 502, the virtual carpool system may determine one or more characteristics of the first driver. For example, the virtual carpool system 202 may determine one or more characteristics of the first driver based on driving behavior data corresponding to the vehicle driven by the first driver. Driving behavior data may include real-time data that is collected by sensors 215, the telematics device 217, and/or the virtual carpool device 212 in the vehicle 217 driven by the first driver. In another embodiment, the one or more characteristics of the first driver may be based on listening preferences, driving patterns, driving scores, insurance scores, or the like. At step 503, the virtual carpool system may assign the first driver to a virtual carpool based on the one or more characteristics. For example, the virtual carpool system 202 may assign the first driver to a virtual carpool for drivers with similar interests or shared interests with the first driver. At step 504, the virtual carpool system may receive a second request for a second driver to participate in virtual carpooling. For example, the virtual carpool system 202 may receive a second request for a second driver to participate in virtual carpooling, wherein the second request is received from the virtual carpool device 212, telematics device 218, and/or mobile device 220 associated with the second driver. The second driver may comprise one of the plurality of drivers 301, and the second driver may drive a second vehicle (e.g., vehicle 217).

At step 505, the virtual carpool system 202 may determine if there are one or more matching characteristics between the first driver and the second driver. For example, the virtual carpool system 202 may determine if the second driver has at least one characteristic that matches one of the one or more characteristics of the first driver. The at least one characteristic of the second driver may be based on at least one of a listening preference, a driving pattern, a driving score, an insurance score, an interest, a preference, or the like that matches one of the one or more characteristics of the first driver. If the virtual carpool system 202 determines that there is at least one matching characteristic between the first driver and the second driver, then the method in this example proceeds to step 506. At step 506, the virtual carpool system may assign the second driver to the same virtual carpool as the first driver. For example, the virtual carpool system 202 may determine that the first driver and the second driver have similar listening preferences or similar driving patterns and thus may assign both drivers to the same virtual carpool. At step 507, the virtual carpool system may bridge the first driver and the second driver together in the same virtual carpool. For example, the first driver and the second driver may be able to communicate in a conference via respective computing devices.

If the virtual carpool system determines that there are no matching characteristics between the first driver and the second driver, then the method in this example proceeds to step 508. At step 508, the virtual carpool system may assign the second driver to a different virtual carpool based on the one or more characteristics of the second driver. For example, the second driver may be a fast driver, whereas the first driver may be a slow driver. Thus, the virtual carpool system 202 may assign the second driver with other fast drivers in a different virtual carpool than the virtual carpool to which the first driver is assigned. At step 509, the virtual carpool system may bridge the second driver with the other drivers in the different virtual carpool.

In an embodiment, a driver may sign up for or opt-in or opt-out of using the virtual carpool service. The driver may provide account information (e.g., name, phone number, email address, billing address, and the like) and subsequently be assigned to a virtual carpool by the virtual carpool system based on the methods described herein. Once the driver has been assigned to a virtual carpool, the driver might not need to request to join the virtual carpool each time after the assignment. For example, the driver may be able to connect to the assigned virtual carpool by a speech input or by selecting the assigned virtual carpool displayed on a user interface of a virtual carpool device. In another embodiment, the driver may receive a notification to join an additional virtual carpool that is looking for participants. For example, the virtual carpool system may contact the driver based on his or her driving behaviors, listening preferences, or interests, and notify the driver of the additional virtual carpool that the driver may join. The driver may opt-in or opt-out of being contacted by the virtual carpool system regarding additional virtual carpools to join.

The virtual carpool system may also allow drivers assigned to a virtual carpool to send messages to and receive messages from each other. For example, there may be a messaging center (e.g., a user interface displaying messages) in a virtual carpool application that each driver may access by a virtual carpool device. Drivers may be able to send messages to or leave notes for each other through the messaging interface in the virtual carpool application. In an embodiment, the messages or notes may be read when the driver is not driving. In another embodiment, the virtual carpool application may read out the message by translating the text to a speech output that the driver may hear from his or her virtual carpool device while he or she is currently driving. This feature may allow drivers to communicate with each other, such as after a virtual carpool conversation, in a safe and hands-free manner.

In yet another embodiment, the virtual carpool service may be temporarily suspended or disabled for certain periods of time for safety purposes. For example, the virtual carpool service may be temporarily suspended or disabled for drivers during certain weather conditions, road conditions, accident conditions, or the like. Drivers who are experiencing such conditions might not be able to use the virtual carpool service until after the weather, road, or accident-related conditions have cleared. That is, the virtual carpool service may be restored after the weather, road, or accident-related conditions have cleared.

FIGS. 6-10 each depict an illustrative diagram of example user interfaces of a virtual carpool application 602 operating on a virtual carpool device 600 in accordance with aspects of the present disclosure. The example user interfaces may be presented on a display of a computing device, such as display 214 of virtual carpool device 212. A driver operating a vehicle, such as vehicle 217, may access a virtual carpool application 602 using a virtual carpool device 600 (e.g., at least one of the virtual carpool device 212, telematics device 218, or mobile device 220). Specifically, FIGS. 6A and 6B illustrate user interfaces of utilizing a virtual carpool application 602 to request to participate in virtual carpooling. The user interface in FIG. 6A depicts a menu for the virtual carpool application 602 that may be displayed on the virtual carpool device 600. The driver operating the virtual carpool device 600 may tap on a button or icon on the user interface to navigate to different screens in the virtual carpool application 602. For example, the driver may select one or more of the following options: "Request Virtual Carpool", "View Virtual Carpools", "View Contact Information", "Send Contact Information", "View Account Information", and "Settings/Preferences." In another embodiment, the driver may navigate to different screens in the virtual carpool application 602 by speech or voice inputs. For example, the driver may select the microphone icon on the user interface to provide voice inputs for selecting different options and navigating screens in the virtual carpool application 602.

Figure 6A:
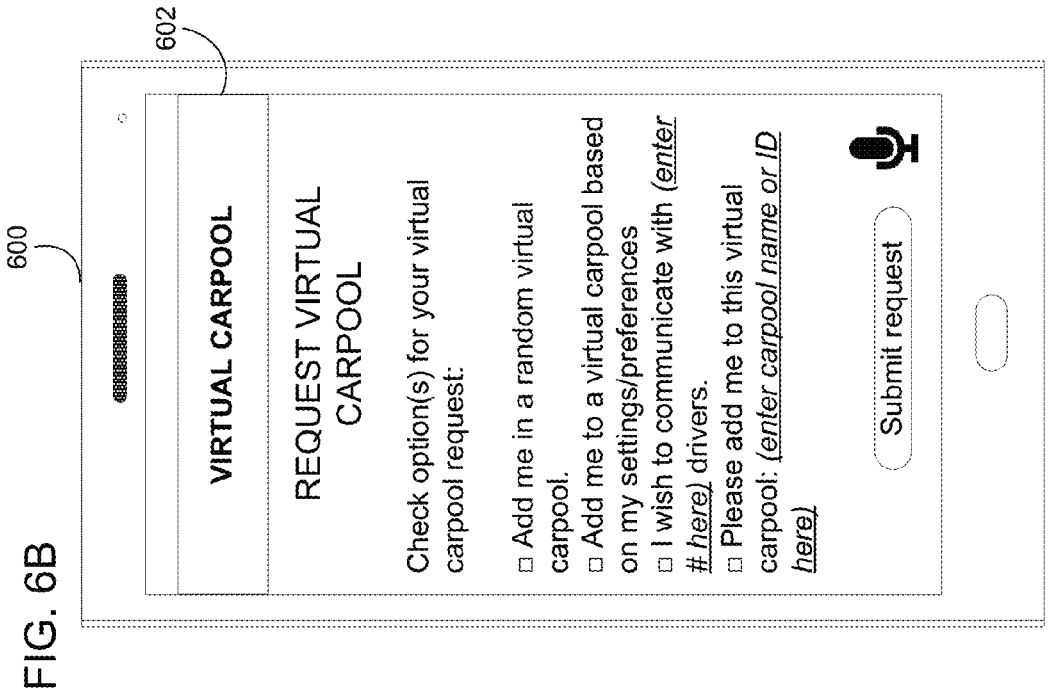
FIGS. 6A and 6B depict an illustrative diagram of example user interfaces of a virtual carpool application in accordance with one or more example embodiments.
Figure 6B:
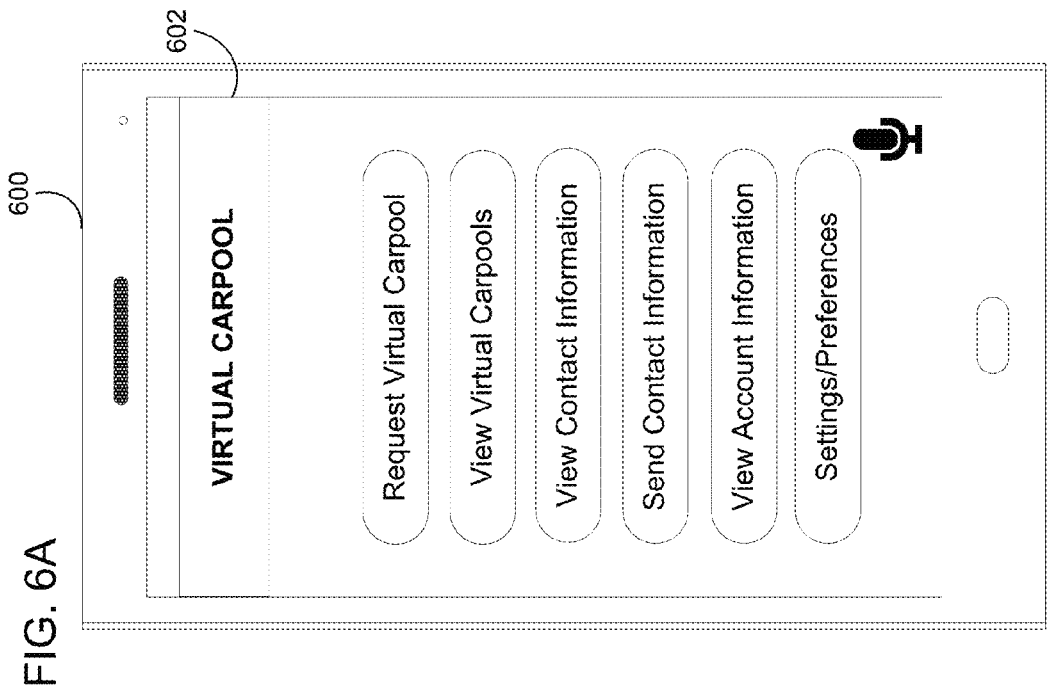

The user interface in FIG. 6B depicts what may be displayed on the virtual carpool device 600 after the driver selects the "Request Virtual Carpool" option shown in the FIG. 6A user interface. In this screen, the driver may select one or more options for his or her virtual carpool request. In an embodiment, the driver may request to be added to a random virtual carpool or a virtual carpool based on his or her settings and/or preferences. For example, the driver may be added to a virtual carpool by the virtual carpool system based on one or more characteristics of the driver. The driver may also indicate a number of drivers he or she wishes to communicate with in a virtual carpool. For example, the driver may specify two drivers, five drivers, ten drivers, or any number of drivers with whom he or she wishes to communicate in the virtual carpool. In another embodiment, the driver may specify a name or another identifier to represent a person with whom the driver wishes to communicate in a virtual carpool. For example, the driver may indicate a name, phone number, or another identifier corresponding to one or more particular drivers to communicate with in a virtual carpool. In another embodiment, the driver may submit a name or an identifier (e.g., a number) for one or more preferred virtual carpools to which the driver wishes to be added.

The driver may also select the microphone icon shown in the user interface in order to submit a virtual carpool request. In an embodiment, by selecting the microphone icon, the virtual carpool application 602 may record and/or detect audio playing in the driver's vehicle in order to determine listening preferences of the driver. For example, the virtual carpool application 602 may transmit a recording of the detected audio to one or more computing devices or a server in the virtual carpool system (e.g., virtual carpool system 202). The virtual carpool system may determine listening preferences of the driver based on identifying a radio station, artist, song, genre, radio personality, or podcast in the detected audio recording. The virtual carpool system may thus assign the driver to a virtual carpool based on the listening preferences.

Figure 7A:
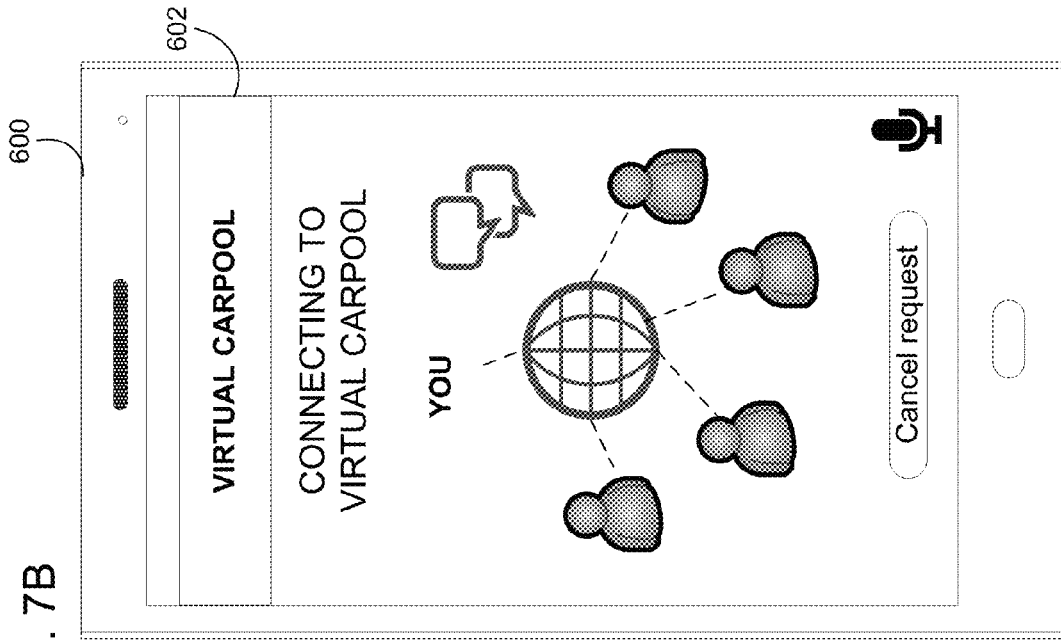
FIGS. 7A and 7B depict an illustrative diagram of example user interfaces of a virtual carpool application in accordance with one or more example embodiments.
Figure 7B:
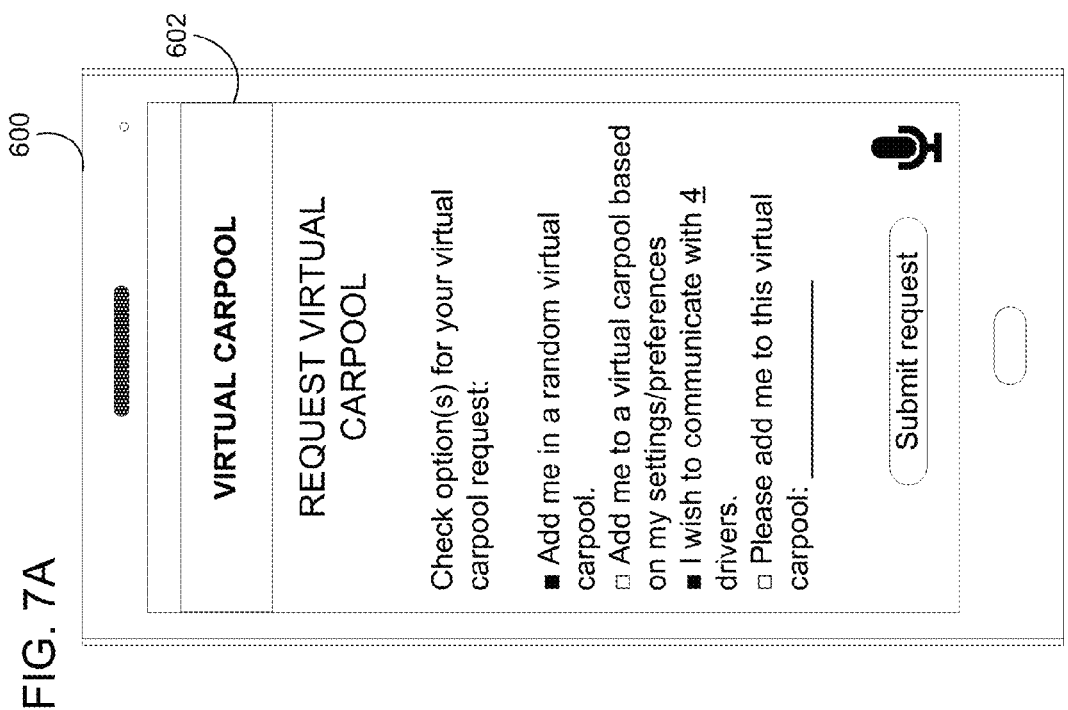

FIGS. 7A and 7B illustrate example user interfaces of a virtual carpool application 602 when it is used to submit a virtual carpool request. The user interface in FIG. 7A depicts an example of one or more options and/or preferences selected by the driver in a virtual carpool request. For example, the driver may select to be added to a random virtual carpool with four other drivers. The driver may navigate to the user interface shown in FIG. 7B by submitting the virtual carpool request (e.g., by selecting the "Submit Request" button) in FIG. 7A. The user interface in FIG. 7B may depict a screen that notifies the driver that he or she is being assigned to a virtual carpool by the virtual carpool system. For example, the virtual carpool system may bridge the driver with four other drivers in a virtual carpool as requested. The driver may also have an option to cancel the request by selecting the "Cancel Request" button shown in FIG. 7B. The user interface in FIG. 7B may be presented by the virtual carpool application 602 while the driver is being connected or bridged by the virtual carpool system to the other drivers in the assigned virtual carpool.

Figure 8B:
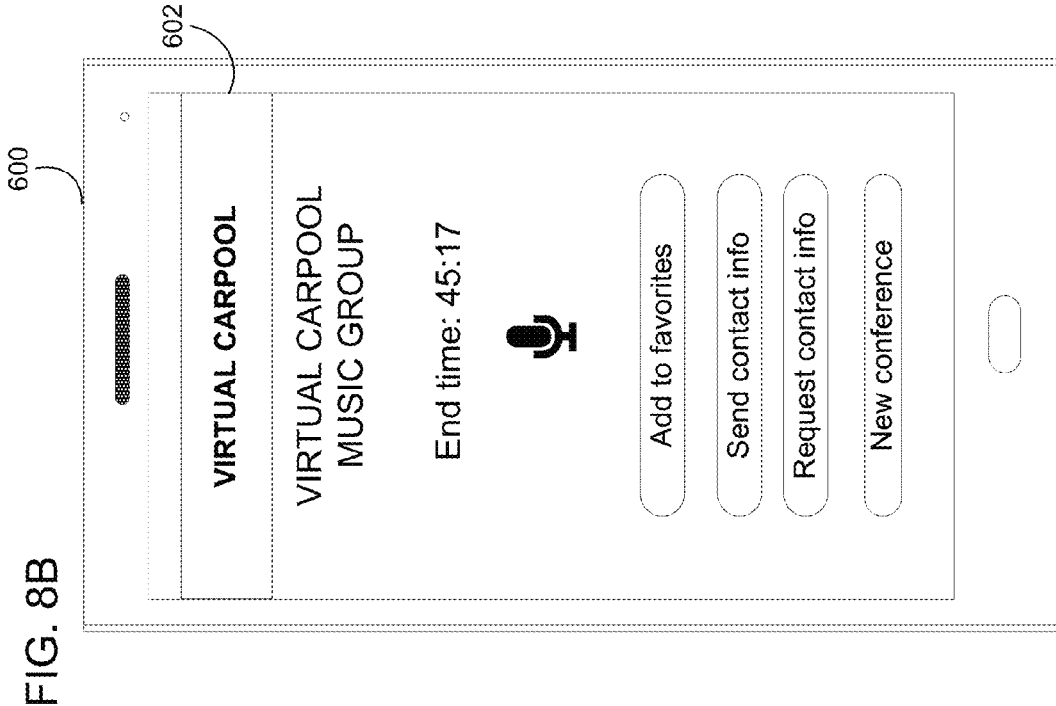
FIGS. 8A and 8B depict an illustrative diagram of example user interfaces of a virtual carpool application in accordance with one or more example embodiments.
Figure 8A:
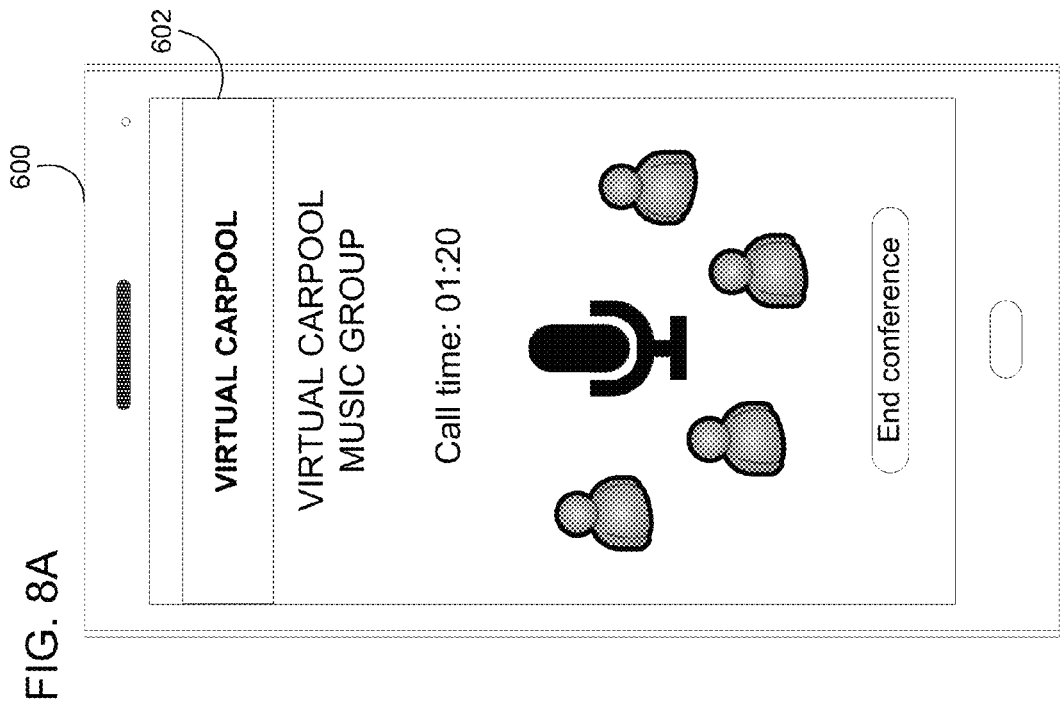

FIGS. 8A and 8B illustrate example user interfaces of a virtual carpool application 602 when it is used for communication with other drivers in a virtual carpool. A driver may be presented with the user interfaces shown in FIGS. 8A and 8B after the virtual carpool system has assigned the driver to the virtual carpool and initiated the conference call between the drivers in the virtual carpool. For example, the driver may be assigned to a virtual carpool associated with a particular music group. That is, the driver and the other four drivers in the virtual carpool may share similar interests (e.g., listening preferences) for the particular music group and may be assigned to the same virtual carpool based on this shared interest. The user interface in FIG. 8A may indicate how long the conference call has lasted (e.g., call time) and the number of drivers who are participating in the virtual carpool. Any of the drivers in the ongoing conference call may leave the conference call or end the virtual carpool at any time by selecting the "End conference" option shown in FIG. 8A. The user interface in FIG. 8B may depict a screen that is shown after a conference call has ended. For example, the user interface may indicate how long the call lasted (e.g., end time), along with other options. The other options may allow the driver to add a virtual carpool to his or her favorites as a preferred virtual carpool. The driver may also send his or her contact information to other drivers in the virtual carpool, request contact information from other drivers in the virtual carpool, and/or request to be added to a new conference.

Figure 9A:
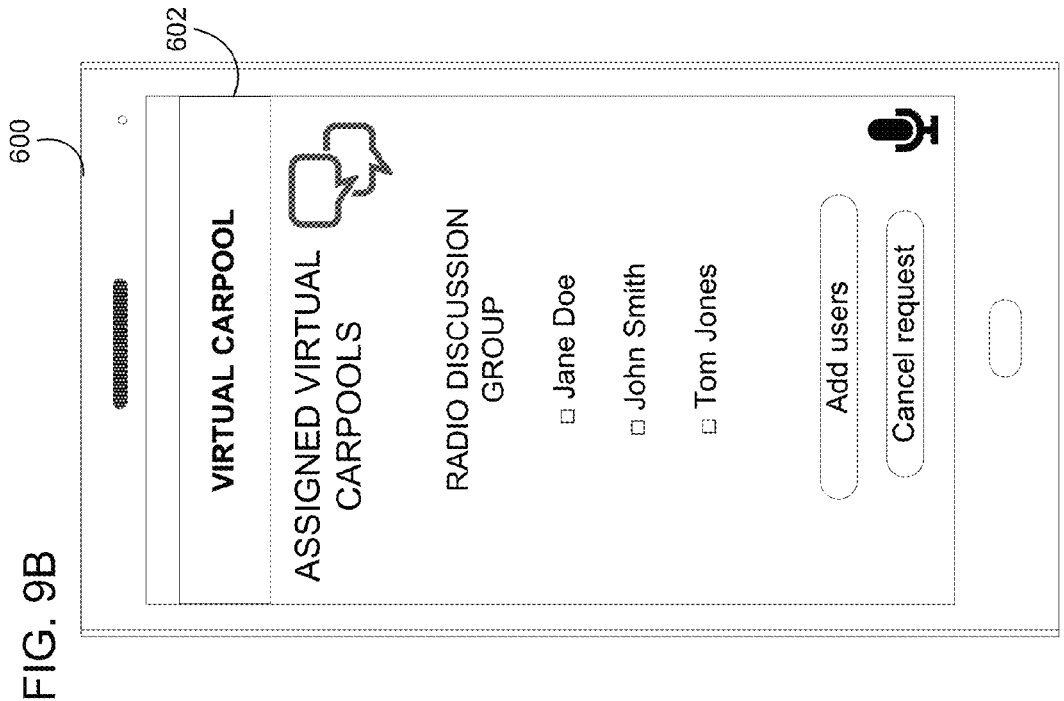
FIGS. 9A and 9B depict an illustrative diagram of example user interfaces of a virtual carpool application in accordance with one or more example embodiments.
Figure 9B:
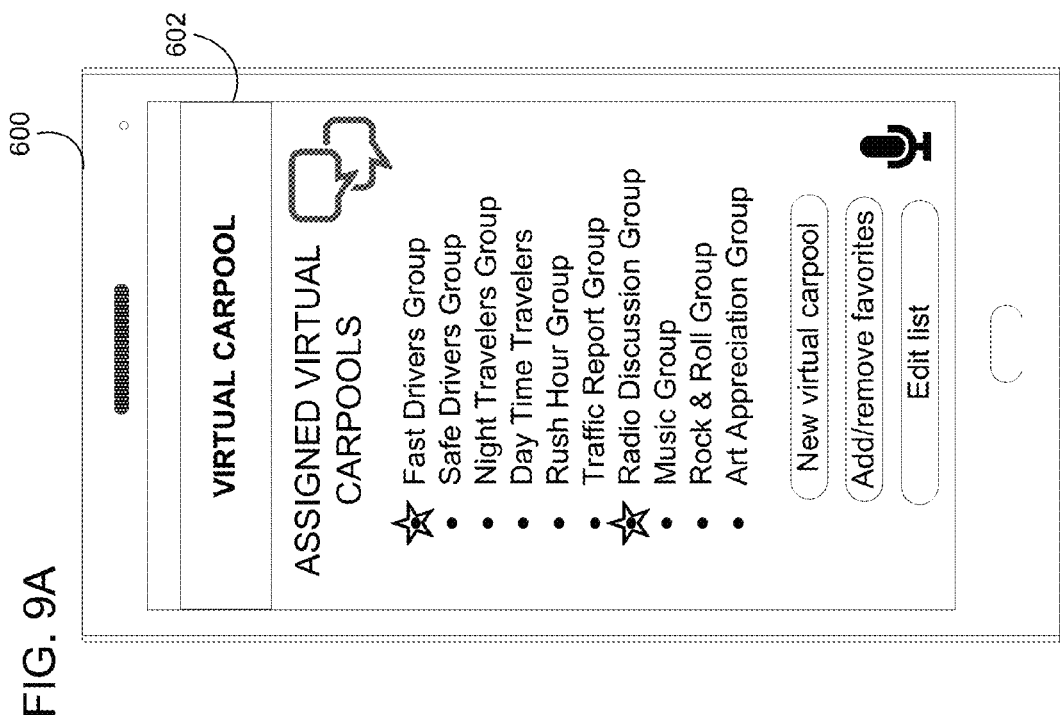

FIGS. 9A and 9B illustrate example user interfaces of a virtual carpool application 602 when it is used to access information regarding assigned virtual carpools. A driver may be able to navigate to the user interfaces shown in FIGS. 9A and 9B by selecting the "View Virtual Carpools" option shown in the FIG. 6A user interface. The user interface in FIG. 9A depicts an example list of virtual carpools that the driver has been assigned to by the virtual carpool system. For example, the driver may be assigned to a variety of virtual carpools based on his or her various interests, preferences, driving behaviors, driving scores, and the like. In an embodiment, the driver may be able to add an assigned virtual carpool to his or her favorites (e.g., preferred virtual carpools) as indicated by the star icons in the FIG. 9A user interface. The driver may also be able to request assignment to a new virtual carpool, add and/or remove preferred virtual carpools, and edit the list of assigned virtual carpools. The user interface in FIG. 9B illustrates an example of a particular virtual carpool (e.g., "Radio Discussion Group") to which the driver has been assigned by the virtual carpool system. The driver may be able to view the other drivers in the virtual carpool and may be able to initiate a new conference call with the other drivers in the virtual carpool. The driver may also request to add one or more new users (e.g., friends or known contacts) to the virtual carpool by submitting contact information associated with the one or more new users. The virtual carpool system may employ the contact information to notify each new user being added to the virtual carpool by the driver. In some embodiments, the driver may also cancel a request to add the one or more new users to the virtual carpool by selecting the "Cancel request" option shown in the FIG. 9B user interface.

Figure 10B:
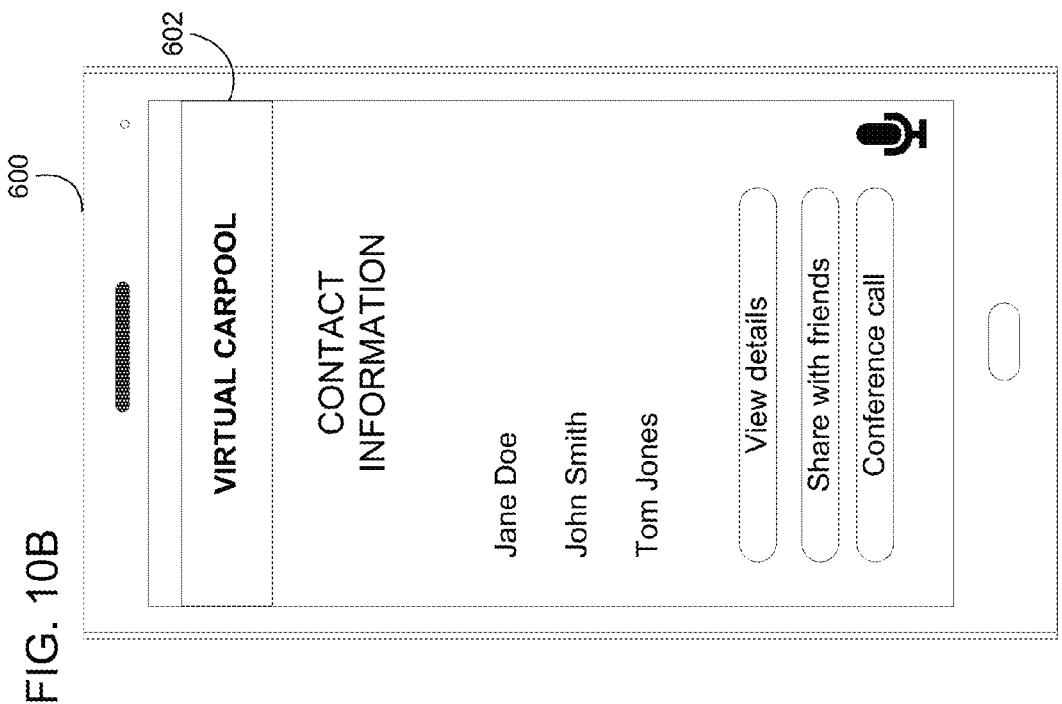
FIGS. 10A and 10B depict an illustrative diagram of example user interfaces of a virtual carpool application in accordance with one or more example embodiments.
Figure 10A:
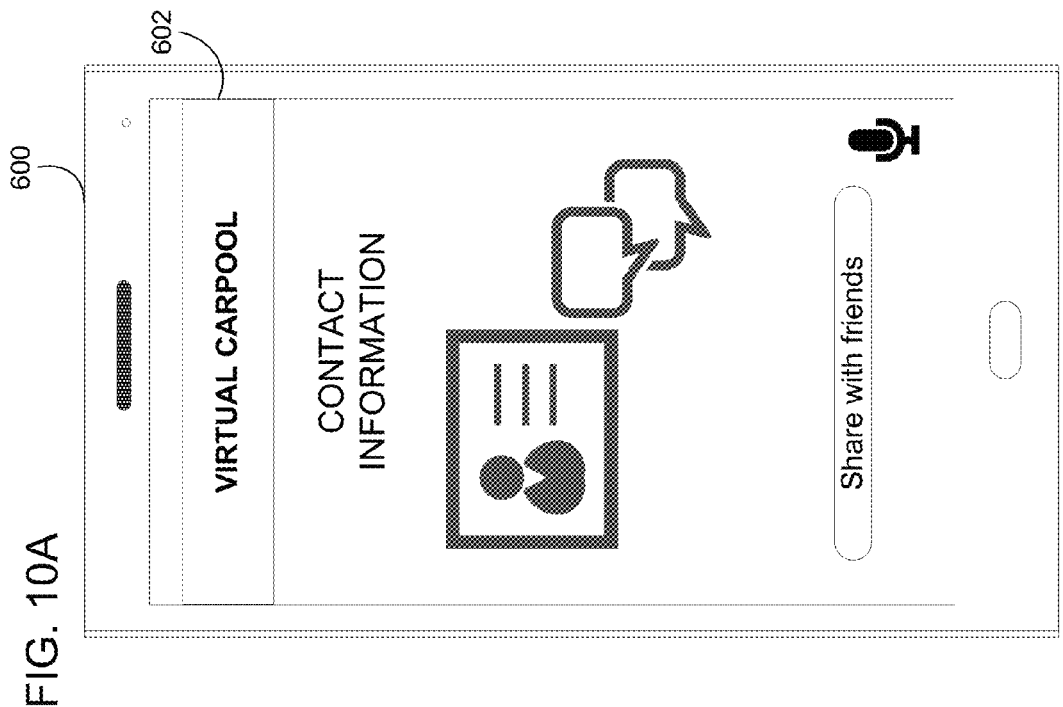

FIGS. 10A and 10B illustrate example user interfaces of a virtual carpool application 602 when it is used to send and/or request contact information. A driver may be able to navigate to the user interfaces shown in FIGS. 10A and 10B by selecting the "View Contact Information" and "Send Contact Information" options, respectively, shown in the FIG. 6A user interface. For example, the driver may be able to send contact information to other drivers with whom the driver has previously communicated in an assigned virtual carpool. The driver may also be able to request to receive contact information from other drivers with whom the driver has previously communicated in an assigned virtual carpool. The user interfaces in FIGS. 10A and 10B depict example screens that may be shown to the driver when sending contact information or requesting contact information from other drivers in an assigned virtual carpool. In some embodiments, the virtual carpool system may send the driver's contact information to other drivers in an assigned virtual carpool in the form of an electronic business card (e.g., a vCard).

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
a first computing device operated by a first driver;
a second computing device operated by a second driver; and
a server comprising at least one processor and at least one memory storing instructions that, when executed by the at least one processor, cause the server to:
receive, from the first computing device, a first request for the first driver to participate in conferencing;
determine one or more characteristics of the first driver based on first driving behavior data corresponding to a vehicle driven by the first driver;
receive, from the first computing device, first audio played in the vehicle driven by the first driver and detected by the first computing device;
determine first listening preferences of the first driver based on the first audio detected by the first computing device;
based on the one or more characteristics of the first driver and based on the first listening preferences of the first driver, assign the first driver to a conference;
receive, from the second computing device, a second request for the second driver to participate in conferencing;
determine one or more characteristics of the second driver based on second driving behavior data corresponding to a vehicle driven by the second driver;
determine, based on the one or more characteristics of the second driver, that the second driver has at least one characteristic that matches at least one characteristic of the one or more characteristics of the first driver;
receive, from the second computing device, second audio played in the vehicle driven by the second driver and detected by the second computing device;
determine second listening preferences of the second driver based on the second audio detected by the second computing device;
based on determining the first listening preferences of the first driver and the second listening preferences of the second driver, determine that the first driver and the second driver have at least one shared listening preference;
based on determining that the second driver has at least one characteristic that matches at least one characteristic of the one or more characteristics of the first driver and based on determining that the first driver and the second driver have at least one shared listening preference, assign the second driver to the conference with the first driver; and
bridge the first computing device operated by the first driver and the second computing device operated by the second driver in the conference.

2. The system of claim 1, wherein receiving the first request for the first driver to participate in conferencing comprises receiving, from the first computing device, information indicating one or more preferred conferences to which the first driver wishes to be added, and wherein the first request is submitted by a speech input from the first driver.

3. The system of claim 1, wherein determining the one or more characteristics of the first driver based on the first driving behavior data comprises determining the one or more characteristics of the first driver based on real-time data that is collected by sensors in the vehicle driven by the first driver while the first driver is driving.

4. The system of claim 1, wherein bridging the first computing device operated by the first driver and the second computing device operated by the second driver in the conference comprising bridging, to the conference, one or more additional computing devices operated by one or more additional drivers each having at least one matching characteristic with the first driver and the second driver and each having the at least one shared listening preference of the first driver and the second driver.

5. The system of claim 1, wherein determining that the second driver has at least one characteristic that matches at least one characteristic of the one or more characteristics of the first driver comprises determining that a driving pattern of the second driver matches a driving pattern of the first driver, a driving score of the second driver matches a driving score of the first driver, or an insurance score of the second driver matches an insurance score of the first driver.

6. The system of claim 1, wherein determining the first listening preferences of the first driver based on the first audio detected by the first computing device comprises determining the first listening preferences of the first driver based on captured audio associated with a radio station played in the vehicle driven by the first driver, captured audio associated with an artist played in the vehicle driven by the first driver, captured audio associated with a song played in the vehicle driven by the first driver, captured audio associated with a genre played in the vehicle driven by the first driver, captured audio associated with a radio personality played in the vehicle driven by the first driver, or captured audio associated with a podcast played in the vehicle driven by the first driver.

7. The system of claim 1, wherein the at least one memory stores additional instructions that, when executed by the at least one processor, cause the server to:
   collect the first driving behavior data corresponding to the vehicle driven by the first driver over a predetermined period of time; and
   determine one or more driving patterns of the first driver based on the first driving behavior data collected over the predetermined period of time,
   wherein determining the one or more characteristics of the first driver based on the first driving behavior data comprises determining the one or more characteristics of the first driver based on the one or more driving patterns of the first driver.

8. The system of claim 7, wherein collecting the first driving behavior data corresponding to the vehicle driven by the first driver over the predetermined period of time comprises collecting the first driving behavior data based on a billing cycle or billing period associated with an insurance policy associated with the first driver.

9. The system of claim 7, wherein determining the one or more driving patterns of the first driver comprises determining the one or more driving patterns of the first driver based on one or more of driving speeds indicated in the first driving behavior data collected over the predetermined period of time, acceleration indicated in the first driving behavior data collected over the predetermined period of time, braking indicated in the first driving behavior data collected over the predetermined period of time, steering indicated in the first driving behavior data collected over the predetermined period of time, uses of turn signals indicated in the first driving behavior data collected over the predetermined period of time, miles driven indicated in the first driving behavior data collected over the predetermined period of time, an amount of time driven at night indicated in the first driving behavior data collected over the predetermined period of time, or an amount of time driven during daytime indicated in the first driving behavior data collected over the predetermined period of time.

10. A method comprising:
   at a server comprising at least one processor and at least one memory:
      receiving, by the at least one processor, from a first computing device operated by a first driver, a first request for the first driver to participate in conferencing;
      determining, by the at least one processor, one or more characteristics of the first driver based on first driving behavior data corresponding to a vehicle driven by the first driver;
      receiving, by the at least one processor, from the first computing device, first audio played in the vehicle driven by the first driver and detected by the first computing device;
      determining, by the at least one processor, first listening preferences of the first driver based on the first audio detected by the first computing device;
      based on the one or more characteristics of the first driver and based on the first listening preferences of the first driver, assigning, by the at least one processor, the first driver to a conference;
      receiving, by the at least one processor, from a second computing device operated by a second driver, a second request for the second driver to participate in conferencing;
      determining, by the at least one processor, one or more characteristics of the second driver based on second driving behavior data corresponding to a vehicle driven by the second driver;
      determining, by the at least one processor, based on the one or more characteristics of the second driver, that the second driver has at least one characteristic that matches at least one characteristic of the one or more characteristics of the first driver;
      receiving, by the at least one processor, from the second computing device, second audio played in the vehicle driven by the second driver and detected by the second computing device;
      determining, by the at least one processor, second listening preferences of the second driver based on the second audio detected by the second computing device;
      based on determining the first listening preferences of the first driver and the second listening preferences of the second driver, determining, by the at least one processor, that the first driver and the second driver have at least one shared listening preference;
      based on determining that the second driver has at least one characteristic that matches at least one characteristic of the one or more characteristics of the first driver and based on determining that the first driver and the second driver have at least one shared listening preference, assigning, by the at least one processor, the second driver to the conference with the first driver; and
      bridging, by the at least one processor, the first computing device operated by the first driver and the second computing device operated by the second driver in the conference.

11. The method of claim 10, wherein receiving the first request for the first driver to participate in conferencing comprises receiving, from the first computing device, information indicating one or more preferred conferences to which the first driver wishes to be added, and wherein the first request is submitted by a speech input from the first driver.

12. The method of claim 10, wherein determining the one or more characteristics of the first driver based on the first driving behavior data comprises determining the one or more characteristics of the first driver based on real-time data that is collected by sensors in the vehicle driven by the first driver while the first driver is driving.

13. The method of claim 10, wherein bridging the first computing device operated by the first driver and the second computing device operated by the second driver in the conference comprising bridging, to the conference, one or more additional computing devices operated by one or more additional drivers each having at least one matching characteristic with the first driver and the second driver and each having the at least one shared listening preference of the first driver and the second driver.

14. The method of claim 10, wherein determining that the second driver has at least one characteristic that matches at least one characteristic of the one or more characteristics of the first driver comprises determining that a driving pattern of the second driver matches a driving pattern of the first driver, a driving score of the second driver matches a driving score of the first driver, or an insurance score of the second driver matches an insurance score of the first driver.

15. The method of claim 10, wherein determining the first listening preferences of the first driver based on the first audio detected by the first computing device comprises determining the first listening preferences of the first driver based on captured audio associated with a radio station played in the vehicle driven by the first driver, captured audio associated with an artist played in the vehicle driven by the first driver, captured audio associated with a song played in the vehicle driven by the first driver, captured audio associated with a genre played in the vehicle driven by the first driver, captured audio associated with a radio personality played in the vehicle driven by the first driver, or captured audio associated with a podcast played in the vehicle driven by the first driver.

16. The method of claim 10, comprising:
collecting, by the at least one processor, the first driving behavior data corresponding to the vehicle driven by the first driver over a predetermined period of time; and
determining, by the at least one processor, one or more driving patterns of the first driver based on the first driving behavior data collected over the predetermined period of time,
wherein determining the one or more characteristics of the first driver based on the first driving behavior data comprises determining the one or more characteristics of the first driver based on the one or more driving patterns of the first driver.

17. The method of claim 16, wherein collecting the first driving behavior data corresponding to the vehicle driven by the first driver over the predetermined period of time comprises collecting the first driving behavior data based on a billing cycle or billing period associated with an insurance policy associated with the first driver.

18. The method of claim 16, wherein determining the one or more driving patterns of the first driver comprises determining the one or more driving patterns of the first driver based on one or more of driving speeds indicated in the first driving behavior data collected over the predetermined period of time, acceleration indicated in the first driving behavior data collected over the predetermined period of time, braking indicated in the first driving behavior data collected over the predetermined period of time, steering indicated in the first driving behavior data collected over the predetermined period of time, uses of turn signals indicated in the first driving behavior data collected over the predetermined period of time, miles driven indicated in the first driving behavior data collected over the predetermined period of time, an amount of time driven at night indicated in the first driving behavior data collected over the predetermined period of time, or an amount of time driven during daytime indicated in the first driving behavior data collected over the predetermined period of time.

19. One or more non-transitory computer readable media storing instructions that, when executed by a server comprising at least one processor and at least one memory, cause the server to:
receive, from a first computing device operated by a first driver, a first request for the first driver to participate in conferencing;
determine one or more characteristics of the first driver based on first driving behavior data corresponding to a vehicle driven by the first driver;
receive, from the first computing device, first audio played in the vehicle driven by the first driver and detected by the first computing device;
determine first listening preferences of the first driver based on the first audio detected by the first computing device;
based on the one or more characteristics of the first driver and based on the first listening preferences of the first driver, assign the first driver to a conference;
receive, from a second computing device operated by a second driver, a second request for the second driver to participate in conferencing;
determine one or more characteristics of the second driver based on second driving behavior data corresponding to a vehicle driven by the second driver;
determine, based on the one or more characteristics of the second driver, that the second driver has at least one characteristic that matches at least one characteristic of the one or more characteristics of the first driver;
receive, from the second computing device, second audio played in the vehicle driven by the second driver and detected by the second computing device;
determine second listening preferences of the second driver based on the second audio detected by the second computing device;
based on determining the first listening preferences of the first driver and the second listening preferences of the second driver, determine that the first driver and the second driver have at least one shared listening preference;
based on determining that the second driver has at least one characteristic that matches at least one characteristic of the one or more characteristics of the first driver and based on determining that the first driver and the second driver have at least one shared listening preference, assign the second driver to the conference with the first driver; and
bridge the first computing device operated by the first driver and the second computing device operated by the second driver in the conference.

20. The one or more non-transitory computer readable media of claim 19, wherein determining the first listening preferences of the first driver based on the first audio detected by the first computing device comprises determining the first listening preferences of the first driver based on captured audio associated with a radio station played in the vehicle driven by the first driver, captured audio associated with an artist played in the vehicle driven by the first driver, captured audio associated with a song played in the vehicle driven by the first driver, captured audio associated with a genre played in the vehicle driven by the first driver, captured audio associated with a radio personality played in the vehicle driven by the first driver, or captured audio associated with a podcast played in the vehicle driven by the first driver.

* * * * *